(12) United States Patent
Zhong et al.

(10) Patent No.: US 10,977,761 B2
(45) Date of Patent: Apr. 13, 2021

(54) DIGITAL WATERMARK EMBEDDING METHOD AND EXTRACTION METHOD, DIGITAL WATERMARK EMBEDDING APPARATUS AND EXTRACTION APPARATUS, AND DIGITAL WATERMARK SYSTEM

(71) Applicant: Tencent Technology (Shenzhen) Company Limited, Guangdong (CN)

(72) Inventors: He Wang Zhong, Guangdong (CN); Liang Sun, Guangdong (CN); Zheng Bin Qu, Guangdong (CN); Da Yi Huang, Guangdong (CN); You Shan Yang, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 183 days.

(21) Appl. No.: 16/377,565

(22) Filed: Apr. 8, 2019

(65) Prior Publication Data

US 2019/0236747 A1 Aug. 1, 2019

Related U.S. Application Data

(63) Continuation of application No. PCT/CN2018/080148, filed on Mar. 23, 2018.

(30) Foreign Application Priority Data

Mar. 29, 2017 (CN) .......................... 201710196907.3

(51) Int. Cl.
*G06T 1/00* (2006.01)
*G06F 21/00* (2013.01)

(52) U.S. Cl.
CPC ............ *G06T 1/0042* (2013.01); *G06F 21/00* (2013.01); *G06T 1/0071* (2013.01);
(Continued)

(58) Field of Classification Search
CPC ... G06T 1/0042; G06T 1/0071; G06T 1/0092; G06T 2201/0062; G06T 2201/0065;
(Continued)

(56) References Cited

U.S. PATENT DOCUMENTS 8,611,531 B2* 12/2013 Joseph ................. H04N 19/188
380/255
2001/0029580 A1* 10/2001 Moskowitz ......... H04L 63/0428
713/176

(Continued)

FOREIGN PATENT DOCUMENTS

CN 1189042 A 7/1998
CN 1658235 A 8/2005
(Continued)

OTHER PUBLICATIONS

Shenbing, Che "Software Watermark Research Based on Portable Execute File" The 5th International Conference on Computer Science and Education, IEEE 2010 (Year: 2010).*
(Continued)

*Primary Examiner* — Kim Y Vu
*Assistant Examiner* — Molly Delaney
(74) *Attorney, Agent, or Firm* — Brinks Gilson & Lione

(57) ABSTRACT

This application relates to the field of digital watermark technologies and discloses a digital watermark embedding method and extraction method, a digital watermark embedding apparatus and extraction apparatus, and a digital watermark system. The method includes obtaining a digital watermark of a composite file, splitting the digital watermark into N sub-watermarks according to a carrier quantity N of the
(Continued)

composite file, each sub-watermark being corresponding to partial content of the digital watermark, embedding an $i^{th}$ sub-watermark in an $i^{th}$ carrier of the composite file, to obtain an $i^{th}$ target carrier, and integrating N target carriers into a target file. This application resolves a problem in the related technology that a digital watermark technology cannot ensure integrity of an order file, and protects carriers of a composite file, thereby ensuring security and integrity of the composite file.

15 Claims, 14 Drawing Sheets

(52) U.S. Cl.
CPC .... *G06T 1/0092* (2013.01); *G06T 2201/0062* (2013.01); *G06T 2201/0065* (2013.01)

(58) Field of Classification Search
CPC .......... G06F 21/00; G06F 21/64; G06F 21/16; G06F 2221/0733; H04L 9/00; H04N 5/278; C06T 2201/0062; C06T 2201/0065
See application file for complete search history.

(56) References Cited

U.S. PATENT DOCUMENTS

| | | | |
|---|---|---|---|
| 2002/0191809 A1* | 12/2002 | Kirovski | H04L 9/30 382/100 |
| 2004/0218761 A1* | 11/2004 | Gustafson | G06T 1/0071 380/238 |
| 2005/0180594 A1 | 8/2005 | Isogai | |
| 2006/0075239 A1* | 4/2006 | Bruekers | G06T 1/0071 713/176 |
| 2008/0080738 A1 | 4/2008 | Takahashi et al. | |
| 2009/0070588 A1* | 3/2009 | Staring | G11B 20/0021 713/176 |
| 2009/0158318 A1* | 6/2009 | Levy | G06F 21/36 725/32 |
| 2010/0077219 A1* | 3/2010 | Moskowitz | G06T 1/0028 713/176 |
| 2014/0093120 A1* | 4/2014 | Reed | G06K 9/00 382/100 |

FOREIGN PATENT DOCUMENTS

| | | |
|---|---|---|
| CN | 101401429 A | 4/2009 |
| CN | 102340669 A | 2/2012 |
| CN | 102402780 A | 4/2012 |
| CN | 102855425 A | 1/2013 |
| CN | 103237271 A | 8/2013 |
| CN | 104850765 A | 8/2015 |
| CN | 108665403 A | 10/2018 |

OTHER PUBLICATIONS

International Search Report and Written Opinion dated Jun. 26, 2018 for PCT Application No. PCT/CN2018/080148, 13 pages.
Aqianiyanqe, "Practice questions for security principle and application of digital content" including abstract; https://www.docin.com/p-1800645489.html; Dec. 3, 2016 (9 pages).
Zheng-yan Zhong et al. "Digital watermarking algorithm based on structure of PDF document" including abstract; "Journal of Computer Applications" vol. 32, Issue 10; Oct. 1, 2012 (4 pages).
Shengbing Che et al. "Software Watermark Research Based"; "2010 5th International Conference on Computer Science & Education"; Sep. 30, 2010 (6 pages).
Chinese Search Report and Chinese First Office Action for Chinese Application No. 2017101969073 dated Jan. 19, 2019 including an English Concise Explanation (12 pages).

* cited by examiner

DIGITAL WATERMARK EMBEDDING METHOD AND EXTRACTION METHOD, DIGITAL WATERMARK EMBEDDING APPARATUS AND EXTRACTION APPARATUS, AND DIGITAL WATERMARK SYSTEM

CROSS-REFERENCE TO RELATED APPLICATION(S)

This application is a continuation of International Patent Application No. PCT/CN2018/080148, filed Mar. 23, 2018, which claims priority to Chinese Patent Application No. 201710196907.3, entitled "DIGITAL WATERMARK EMBEDDING METHOD AND EXTRACTION METHOD, DIGITAL WATERMARK EMBEDDING APPARATUS AND EXTRACTION APPARATUS, AND DIGITAL WATERMARK SYSTEM", filed with China National Intellectual Property Administration on Mar. 29, 2017, all of which are hereby incorporated by reference in their entirety.

FIELD OF THE TECHNOLOGY

Embodiments of this application relate to the field of digital watermark technologies, and in particular, to a digital watermark embedding method and extraction method, a digital watermark embedding apparatus and extraction apparatus, and a digital watermark system.

BACKGROUND OF THE DISCLOSURE

A digital watermark technology is a technology of embedding a digital watermark in a carrier without affecting normal use of the carrier. The carrier may be at least one of an image, a document, a video, and software. The digital watermark may be identification information such as a key or anti-counterfeiting information. The digital watermark is not easily detected and modified again but can be identified by an embedding part. It can be determined whether a carrier has been tampered with by identifying a digital watermark hidden in the carrier.

For a carrier in which a digital watermark has been embedded, it can be determined whether the carrier is stolen or forged by verifying validity of the digital watermark after extracting the digital watermark in the carrier. With the development of the digital watermark technology, more and more digital watermark embedding algorithms emerge. A typical digital watermark embedding algorithm includes: embedding a preset key in a watermark image (such as a bitmap file or a binary image), to obtain watermark information in an image format; then re-encoding and encrypting the watermark information in the image format, to obtain watermark information in a binary format; and finally embedding the watermark information in the binary format in a carrier.

An order file is a file transmitted between a sender and a receiver through a network platform. During transmission of the order file, a source file of an order may be maliciously tampered with, and a signature image of the order may be maliciously stolen. Because the source file and the signature image are in different formats, different digital watermark embedding algorithms are used. In the typical digital watermark embedding algorithm, a digital watermark is embedded in only one format of carrier. Therefore, one digital watermark can protect only one of the source file or the signature image. To protect both the source file and the signature image, two digital watermarks need to be used, one digital watermark is embedded in the source file, and the other digital watermark is embedded in the signature image. During verification of the digital watermarks, the digital watermarks in the source file and the signature image need to be separately verified. Consequently, the amount of computation and interactive operations in the digital watermark embedding process and verification process are multiplied.

SUMMARY

Embodiments of this application provide a digital watermark embedding method and extraction method, a digital watermark embedding apparatus and extraction apparatus, and a digital watermark system, to resolve problems that integrity of an order file cannot be ensured when a watermark embedding mechanism and a watermark verification mechanism that are independent of each other are used, and that the amount of computation and interactive operations in a digital watermark embedding process and verification process are multiplied as a quantity of carriers in a composite file is increased. The technical solutions are as follows:

According to one embodiment, a digital watermark embedding method is provided, the method including: obtaining a digital watermark of a composite file, the composite file including at least two carriers; splitting the digital watermark into N sub-watermarks according to a carrier quantity N of the composite file, each sub-watermark being corresponding to partial content of the digital watermark, N being a positive integer, and N>1; embedding an $i^{th}$ sub-watermark in an $i^{th}$ carrier of the composite file, to obtain an $i^{th}$ target carrier, i being a positive integer, and $1 \leq i \leq N$; and integrating N target carriers into a target file.

According to another embodiment, a digital watermark extraction method is provided, the method including: extracting a corresponding sub-watermark from each carrier included in a target file after the target file is obtained; combining the extracted sub-watermarks into a digital watermark; and verifying the digital watermark; the target file including at least two carriers, the digital watermark being an implicit identifier embedded in the target file, the sub-watermark being an implicit identifier embedded in the corresponding carrier, and each sub-watermark being corresponding to partial content of the digital watermark.

According to another embodiment, a digital watermark embedding apparatus is provided, the apparatus including: an obtaining module, configured to obtain a digital watermark of a composite file, the composite file including at least two carriers; a split module, configured to split the digital watermark into N sub-watermarks according to a carrier quantity N of the composite file obtained by the obtaining module, each sub-watermark being corresponding to partial content of the digital watermark, N being a positive integer, and N>1; an embedding module, configured to embed, in an $i^{th}$ carrier of the composite file, an $i^{th}$ sub-watermark obtained through splitting by the split module to obtain an $i^{th}$ target carrier, i being a positive integer, and $1 \leq i \leq N$; and an integration module, configured to integrate N target carriers into a target file.

According to another embodiment, a digital watermark extraction apparatus is provided, the apparatus including: an extraction module, configured to extract a corresponding sub-watermark from each carrier included in a target file after the target file is obtained; a combination module, configured to combine the sub-watermarks extracted by the extraction module into a digital watermark; and a verification module, configured to verify the digital watermark obtained by the combination module; the target file including at least two carriers, the digital watermark being an implicit identifier embedded in the target file, the sub-watermark being an implicit identifier embedded in the corresponding carrier, and each sub-watermark being corresponding to partial content of the digital watermark.

According to another embodiment, a server is provided, the server including a processor and a memory, the system memory storing one or more programs, and the one or more programs being executed by one or more processors to perform a digital watermark embedding method.

According to another embodiment, a server is provided, the server including a processor and a memory, the system memory storing one or more programs, and the one or more programs being executed by one or more processors to perform a digital watermark extraction method.

According to another embodiment, a computer readable medium is provided, the computer readable medium storing one or more programs, and the one or more programs being executed by one or more processors to perform a digital watermark embedding method.

According to another embodiment, a computer readable medium is provided, the computer readable medium storing one or more programs, and the one or more programs being executed by one or more processors to perform a digital watermark extraction method.

According to another embodiment, a digital watermark system is provided, the digital watermark system including a digital watermark embedding apparatus and a digital watermark extraction apparatus; the digital watermark embedding apparatus includes the foregoing digital watermark embedding apparatus; and the digital watermark extraction apparatus includes the foregoing digital watermark extraction apparatus; or the digital watermark embedding apparatus is the foregoing server for performing the digital watermark embedding method; and the digital watermark extraction apparatus is the foregoing server for performing the digital watermark extraction method.

The technical solutions provided in the embodiments of this application have at least the following beneficial effects:

A digital watermark is split into several sub-watermarks with the same quantity as carriers of a composite file, then an $i^{th}$ sub-watermark is embedded in an $i^{th}$ carrier of the composite file, to obtain an $i^{th}$ target carrier, and after all the sub-watermark are embedded, target carriers are integrated into a target file. For a composite file including at least two carriers, a part of the digital watermark is embedded in each carrier, so that all the carriers of the composite file are protected. Because only one digital watermark needs to be generated, and the sub-watermarks embedded in the carriers are associated, all the carriers of the composite file can be protected, thereby ensuring integrity of the composite file, and reducing the amount of computation and interactive operations in a digital watermark embedding process.

A corresponding sub-watermark is extracted from each carrier of a composite file respectively, and then the sub-watermarks are combined into a digital watermark for verification, so that it can be detected whether the composite file has been tampered with, or it can be detected whether a part of the composite file has been tampered with, thereby resolving a problem in the related technology that integrity of a composite file cannot be ensured because digital watermarks in carriers need to be separately verified. In addition, because the sub-watermarks are associated, only the digital watermark finally obtained through combination needs to be verified, and it can be quickly determined whether the composite file or a part of the composite file has been tampered with, thereby ensuring the integrity of the composite file and reducing the amount of computation and interactive operations during verification of the digital watermark in the composite file.

DESCRIPTION OF EMBODIMENTS

To make objectives, technical solutions, and advantages of this application clearer, the following further describes in detail implementations of this application with reference to the accompanying drawings.

Figure 1:
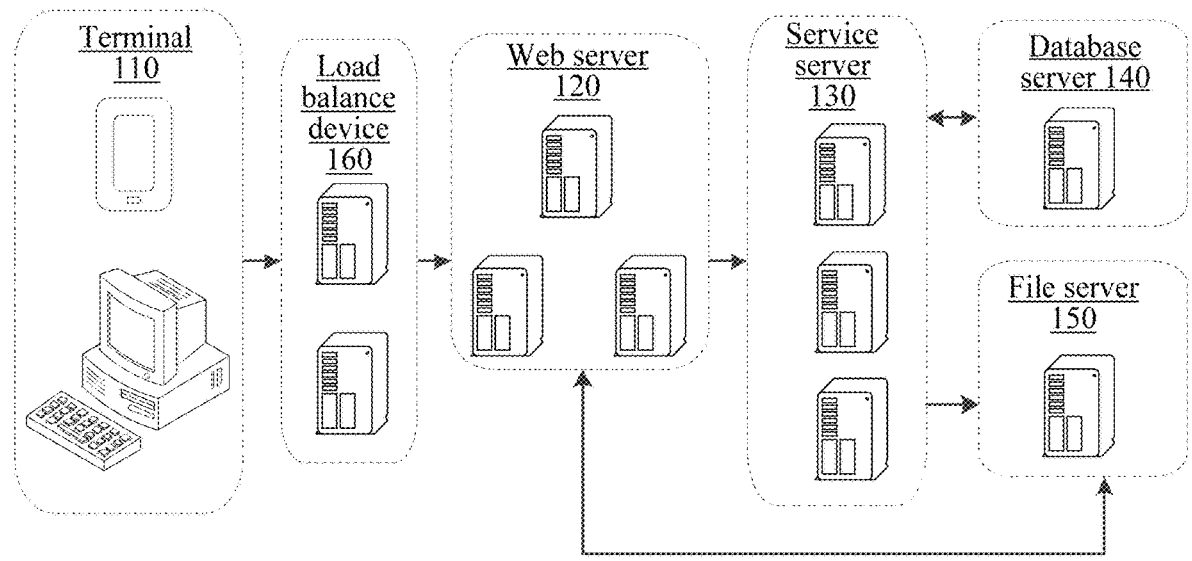
FIG. 1 is a schematic diagram of an implementation scenario according to an exemplary embodiment of this application.

FIG. 1 is a schematic diagram of an implementation scenario according to an exemplary embodiment of this application. As shown in FIG. 1, the implementation scenario includes a terminal 110, a web server 120, a service server 130, a database server 140, and a file server 150.

The terminal 110 has a capability of web browsing, and a user can open a web page by using the terminal 110. Information related to a file is input into the web page, the web page generates a file request according to the information related to the file, and the terminal 110 is configured to send the file request to the web server 120.

Optionally, a file processing application program may be installed in the terminal 110, and the user runs the file processing application program by using the terminal 110. The user controls the file processing application program to generate a file request, and the terminal 110 sends the file request to the web server 120.

Optionally, the terminal 110 includes a desktop computer, a laptop computer, a tablet computer, a smartphone, an ebook reader, a procurement-specific computer device, or the like.

Optionally, the file is an independent file or a composite file. The independent file includes a carrier of only one type of file, for example, a document, an image, a video, or audio. The composite file includes at least two types of carriers, for example, an order file (a source file in a document format+a signature image), or a contract file (a contractual text in a document format+a signature image+a fingerprint image).

The web server 120 is a platform configured to provide data receiving and data forwarding. After receiving the file request sent by the terminal 110, the web server 120 forwards the file request to the service server 130 for processing.

The service server 130 is configured to embed and verify a digital watermark for the file. The digital watermark is an implicit identifier to be embedded in a file without affecting normal use of the file. Optionally, the digital watermark is generated according to identification information of the file by using a predetermined digital encryption rule and is embedded in the file according to a predetermined embedding rule. The identification information is an explicit identifier used for uniquely identifying the file, for example, a file name, or a file number.

An order file is used as an example. Identification information of the order file may be an order number, a predetermined digital encryption rule is a message-digest algorithm 5 (MD-5 algorithm). During encryption by using the MD-5 algorithm, the MD-5 algorithm is performed on the order number plus a random number to generate a digital watermark; or the MD-5 algorithm is performed on the order number plus a globally unique identifier (GUID) to generate a digital watermark. The random number or the GUID herein each corresponds to the order number, and the digital watermark generated by using the MD-5 algorithm is usually a 32-bit character string. The predetermined embedding rule includes a digital watermark embedding position, or embedding manner, or the like.

The database server 140 is configured to store related information of the digital watermark. The related information of the digital watermark includes a correspondence between the digital watermark and the file, a generation rule of the digital watermark, an embedding rule of the digital watermark, or the like. The storing the correspondence between the digital watermark and the file refers to storing the digital watermark and the identification information of the file in correspondence with each other. The generation rule of the digital watermark includes an encryption algorithm of the digital watermark, and data (the random number or the GUID) used during encryption. The embedding rule of the digital watermark includes the digital watermark embedding manner, or embedding position, or the like.

Optionally, the database server 140 includes a database request queue, a database processing module, and a database. The database server 140 sequentially adds received requests to the database request queue. The database processing module sequentially extracts the requests from the database request queue, and creates a corresponding task for each request, the created task including a read operation, a write operation, a delete operation, or the like in the database. The database is configured to store data.

The file server 150 is configured to store a file in which the digital watermark has been embedded. When needing to obtain a file, the user uses the terminal 110 to send an obtaining request to the web server 120. The web server 120 invokes the file server 150 according to the obtaining request to obtain the corresponding file.

Optionally, the foregoing various servers may be one server, or a server cluster including several servers, or two or several adjacent servers are combined and implemented as the same server. Data may be shared between servers in a server cluster. The sharing refers to complete sharing or partial sharing.

Optionally, the implementation scenario further includes a load balance device 160. The load balance device 160 is disposed between the terminal 110 and the web server 120. The terminal 110 first sends a file request to the load balance device 160. The load balance device 160 randomly allocates the file request to a web server 120, or the load balance device 160 allocates the file request to a web server 120 with small load according to a load status of the web server 120.

It should be noted that the foregoing implementation environment is merely an exemplary description and represents only a typical implementation environment. In a different embodiment, there may be an implementation environment in another form, for example, an implementation environment including a first terminal and a second terminal, the first terminal being a computer of a generator/sender of a composite file, and the second terminal being a computer of a storage side/receiver of a composite file.

An order file is used as an example below to separately describe an order file generation process and verification process with reference to the implementation scenario.

The order file generation process is as follows:

The terminal 110 opens a web page. The web page generates an order file generation request according to a source file and a signature image of an input order. The web page sends the order file generation request to the load balance device 160. The load balance device 160 allocates the order file generation request to a web server 120. The web server 120 receives the order file generation request, and sends the order file generation request to the service server 130 for processing. After receiving the order file generation request, the service server 130 obtains the source file and the signature image of the order, generates a digital watermark, embed the digital watermark, then integrates the source file and the signature image into an order file, stores the integrated order file in the file server 150, and stores related information of the digital watermark in the database server 140.

The order file verification process is as follows:

The terminal 110 opens a web page. The web page generates an order file verification request according to related information (such as an order number) of an input order file. The web page sends the order file verification request to the load balance device 160. The load balance device 160 allocates the order file verification request to a web server 120. After receiving the order file verification request, the web server 120 invokes the file server 150, obtains the corresponding order file according to the order file verification request, and sends the obtained order file to the service server 130 for verification. The service server 130 obtains related information of a digital watermark corresponding to the order file from the database server 140, extracts the digital watermark from the order file according to the related information of the digital watermark, and compares the extracted digital watermark with a stored digital watermark, to determine whether the order file has been tampered with.

In the related technology, there are digital watermark embedding algorithms respectively corresponding to independent files such as various documents, images, audio, or videos. However, for a composite file such as an order file or a contract file that includes at least two carriers, the related technology can embed a digital watermark in only one carrier, and consequently, the composite file cannot be well protected. A digital watermark embedding method and a digital watermark extraction method involved in embodiments of this application can be applied to the composite file. The following describes the digital watermark embedding method and the digital watermark extraction method in the composite file by using the embodiments of this application.

Figure 2:
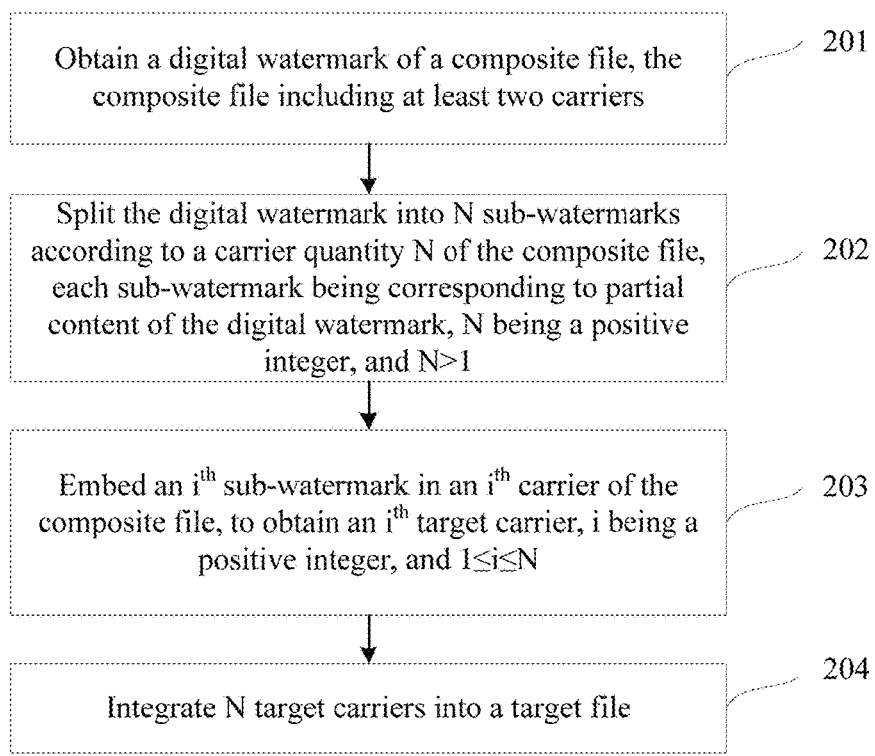
FIG. 2 is a method flowchart of a digital watermark embedding method according to an exemplary embodiment of this application.

FIG. 2 is a method flowchart of a digital watermark embedding method according to an embodiment of this application. For example, the digital watermark embedding method is applied to the service server 130 shown in FIG. 1. As shown in FIG. 2, the digital watermark embedding method may include the following steps:

Step 201. Obtain a digital watermark of a composite file, the composite file including at least two carriers.

Optionally, the carrier may be one of a document, an image, audio, and a video. The carrier may alternatively be referred to as a file, a subfile, a digital carrier, or a binary carrier, or another name may be used.

The composite file includes at least two carriers. For example, an order file may include a source file and a signature image of an order. The source file of the order is content of the order and includes at least an order number, an order quantity, an order type, an order time, an order product, and the like. To sign on the source file of the order means that the source file is confirmed to be valid. For an order file transmitted on a network platform, it is usually not to sign on each source file but to integrate the same signature image and a plurality of source files of an order into the order file.

The digital watermark is an implicit identifier to be embedded in a file without affecting normal use of the file. The digital watermark has security and invisibility. The security means that the digital watermark is not easily tampered with or forged. The invisibility means that the digital watermark is not easily perceived by a non-embedding party or a third party, and normal use of protected data (a carrier in which the digital watermark is embedded) is not affected.

The digital watermark corresponds to the composite file in which the digital watermark is embedded. That is, the digital watermark is used for uniquely identifying the composite file in which the digital watermark is embedded.

Step 202. Split the digital watermark into N sub-watermarks according to a carrier quantity N of the composite file, each sub-watermark being corresponding to partial content of the digital watermark, N being a positive integer, and N>1.

To enable the digital watermark to be embedded in each carrier of the composite file, the digital watermark is split into sub-watermarks with the same quantity as the carriers of the composite file. For example, a digital watermark includes a 10-bit character string, indicated as S56FHY8SJ2. When there are three carriers in the composite file, the digital watermark is split into three sub-watermarks, the first sub-watermark being S56F, the second sub-watermark being HY8, and the third sub-watermark being SJ2.

N sub-watermarks of the digital watermark can be re-spliced into a complete digital watermark in the order of splitting.

Step 203. Embed an $i^{th}$ sub-watermark in an $i^{th}$ carrier of the composite file, to obtain an $i^{th}$ target carrier, i being a positive integer, and $1 \leq i \leq N$.

Assuming that the composite file is a contract file, including three carriers: a contractual text, a signature image, and a fingerprint image. Corresponding to the example of the digital watermark in step 202, the first sub-watermark S56F is embedded in the contractual text, the second sub-watermark HY8 is embedded in the signature image, and the third sub-watermark SJ2 is embedded in the fingerprint image.

When sub-watermarks are to be embedded in different types of carriers, the service server 130 analyzes the different types of carriers, to determine corresponding watermark embedding algorithms.

The target carrier refers to a carrier carrying a sub-watermark.

Step 204. Integrate N target carriers into a target file.

After the sub-watermarks are respectively embedded in the corresponding carriers in step 203, the target carriers are integrated into the target file according to a composite file generation manner.

The target file refers to a composite file carrying a digital watermark.

Figure 3:
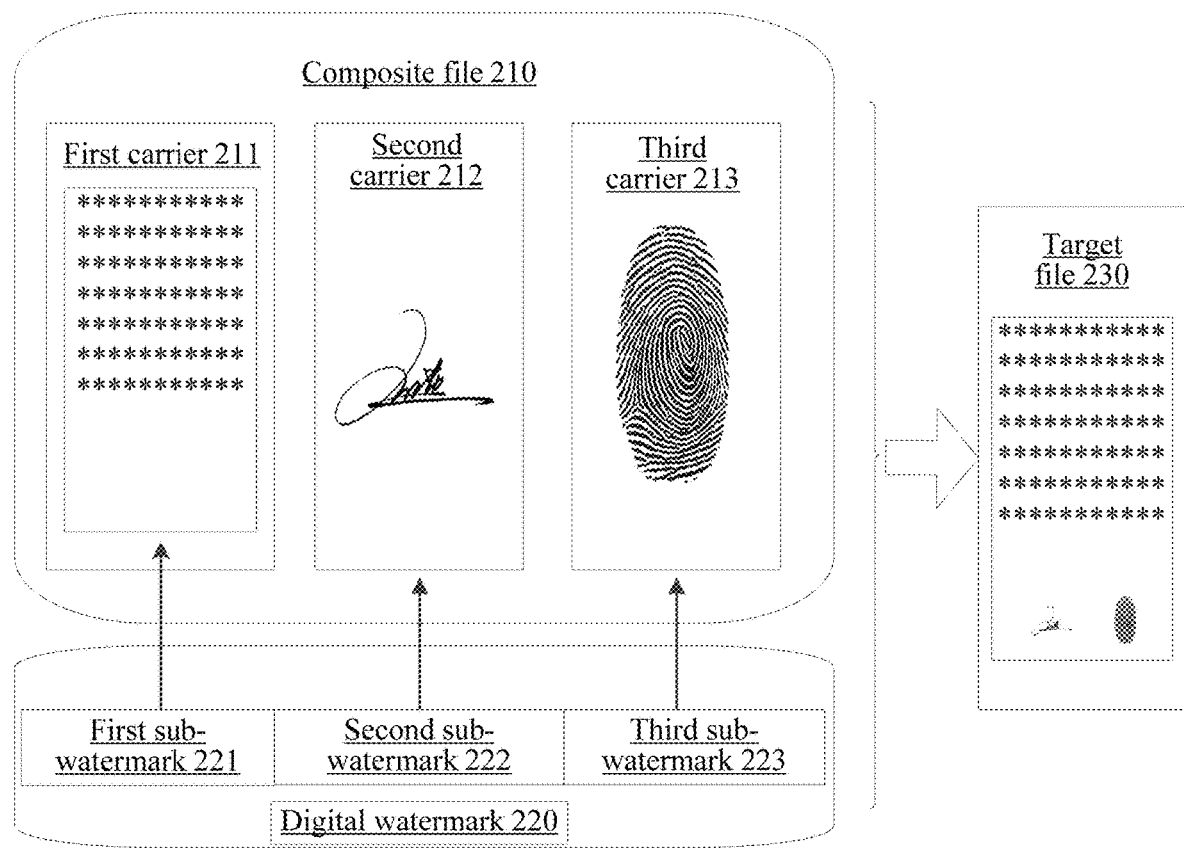
FIG. 3 is a schematic diagram of a digital watermark embedding method according to an exemplary embodiment of this application.

The following describes the digital watermark shown in FIG. 3 that may have been referenced by the embodied method shown in FIG. 2. As shown in FIG. 3, a composite file 210 includes a first carrier 211, a second carrier 212, and a third carrier 213, a digital watermark 220 is split into a first sub-watermark 221, a second sub-watermark 222, and a third sub-watermark 223, the first sub-watermark 221 is embedded in the first carrier 211, the second sub-watermark 222 is embedded in the second carrier 212, the third sub-watermark 223 is embedded in the third carrier 213, and finally, the three carriers are integrated into a target file 230. The target file 230 may be a file or a group of files. A group of files is a combination of several carriers. For example, in FIG. 3, the target file 230 is a file. However, this is not limited in this embodiment of this application.

In conclusion, in the digital watermark embedding method provided in this embodiment of this application, a digital watermark is split into several sub-watermarks with the same quantity as carriers of a composite file, then an $i^{th}$ sub-watermark is embedded in an $i^{th}$ carrier of the composite file, to obtain an $i^{th}$ target carrier, and after all the sub-watermark are embedded, target carriers are integrated into a target file. For a composite file including at least two carriers, a part of the digital watermark is embedded in each carrier, so that all the carriers of the composite file are protected. Because only one digital watermark needs to be generated, and the sub-watermarks embedded in the carriers are associated, all the carriers of the composite file can be protected, thereby ensuring integrity of the composite file, and reducing the amount of computation and interactive operations in a digital watermark embedding process.

Figure 4:
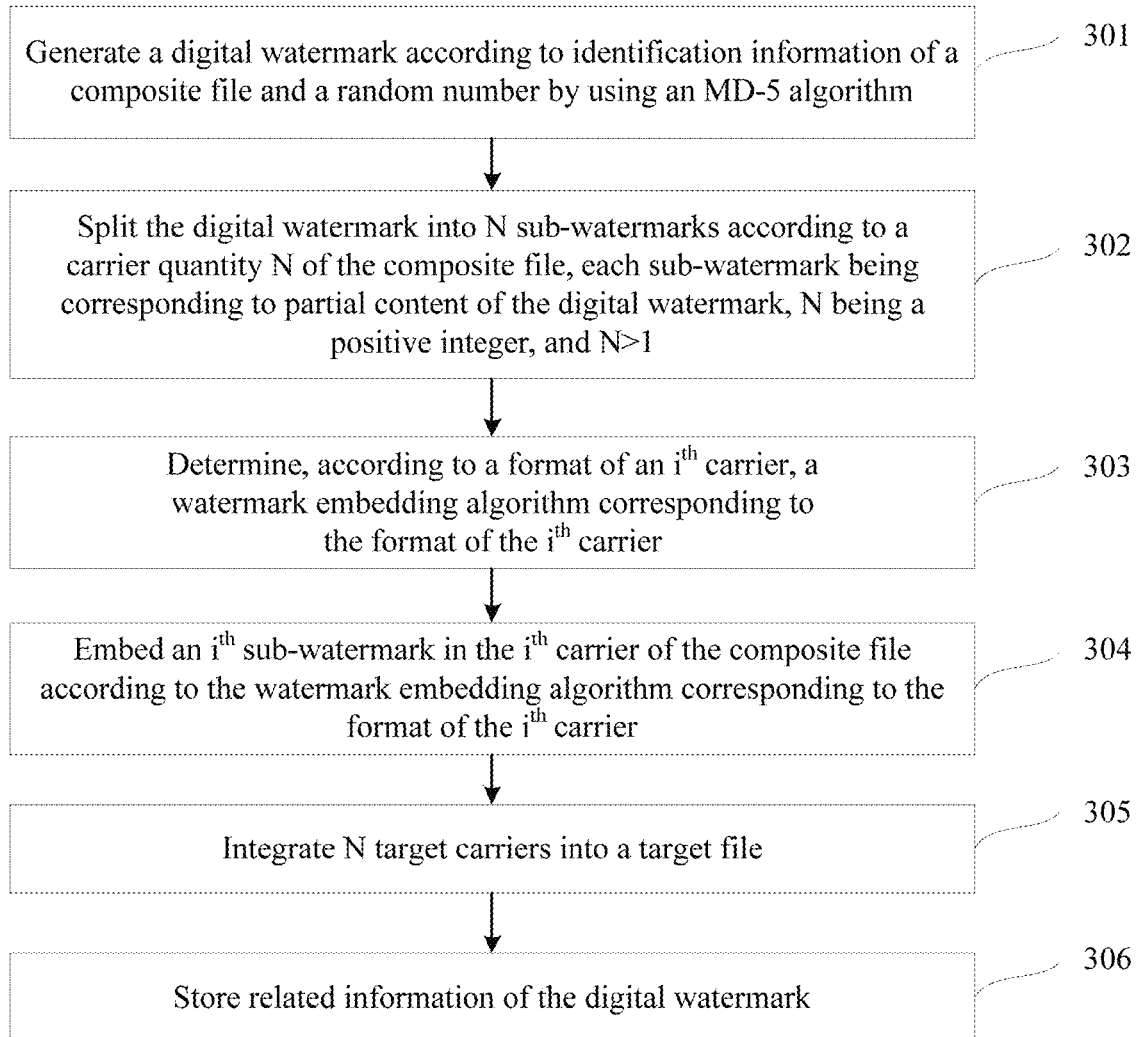
FIG. 4 is a method flowchart of a digital watermark embedding method according to another exemplary embodiment of this application.

FIG. 4 is a method flowchart of a digital watermark embedding method according to another embodiment of this application. For example, the digital watermark embedding method is applied to the service server 130 shown in FIG. 1. As shown in FIG. 4, the digital watermark embedding method may include the following steps:

Step 301. Generate a digital watermark according to identification information of a composite file and a random number by using an MD-5 algorithm.

The composite file includes at least two carriers. Optionally, the carrier is one of a document, an image, audio, and a video. For example, an order file may include a source file and a signature image of an order. The source file of the order records content of the order and includes at least an order number, an order quantity, an order type, an order time, an order product, and the like. To sign on the source file of the order means that the source file is confirmed to be valid. For an order file transmitted on a network platform, it is usually not to sign on each source file but to integrate the same signature image and source files of an order into the order file.

The identification information is an explicit identifier used for uniquely identifying the composite file. Using an order file as an example, identification information of the order file may be an order number of the order file.

The random number corresponds to the identification information of the composite file. The random number is an integer sequence of any length and is randomly generated by the service server 130.

Optionally, the random number is allowed to be replaced with a GUID.

After the identification information and the random number are spliced, data after the splicing is encrypted by using the MD-5 algorithm, to obtain a character string of a fixed length. Usually, a 32-bit character string is obtained by using the MD-5 algorithm. Optionally, the MD-5 algorithm may be replaced with another irreversible mapping algorithm.

The digital watermark is an implicit identifier to be embedded in a file without affecting normal use of the file. The digital watermark has security and invisibility. The security means that the digital watermark is not easily tampered with or forged. The invisibility means that the digital watermark is not easily perceived by a non-embedding party or a third party, and normal use of protected data (a carrier in which the digital watermark is embedded) is not affected.

The digital watermark corresponds to the composite file in which the digital watermark is embedded. That is, the digital watermark is used for uniquely identifying the composite file in which the digital watermark is embedded. In other words, the digital watermark is in a one-to-one correspondence with the composite file in which the digital watermark is embedded.

Optionally, after obtaining the digital watermark by using the MD-5 algorithm, the service server 130 stores the identification information of the composite file, the random number, and the digital watermark in correspondence with each other in the database server 140.

Step 302. Split the digital watermark into N sub-watermarks according to a carrier quantity N of the composite file, each sub-watermark being corresponding to partial content of the digital watermark, N being a positive integer, and N>1.

To enable the digital watermark to be embedded in each carrier of the composite file, the digital watermark is split into sub-watermarks with the same quantity as the carriers of the composite file.

Optionally, after splitting the digital watermark into N sub-watermarks, the service server 130 stores a splitting rule of the digital watermark and the identification information of the composite file in correspondence with each other in the database server 140. The splitting rule of the digital watermark includes at least a splitting quantity and a digit quantity corresponding to each sub-watermark.

Optionally, a relationship between digit quantities of the sub-watermarks after the digital watermark is split includes:
the digit quantities of the sub-watermarks are the same; or there are at least two sub-watermarks with the same digit quantity in the N sub-watermarks; or the digit quantities of the sub-watermarks are different.

Step 303. Determine, according to a format of an $i^{th}$ carrier, a watermark embedding algorithm corresponding to the format of the $i^{th}$ carrier.

When sub-watermarks are to be embedded in different types of carriers, the service server 130 analyzes the different types of carriers, to determine corresponding watermark embedding algorithms.

Because carriers in different formats have different features, watermark embedding algorithms for the carriers in the different formats are usually different. Optionally, each format of carrier has a different watermark embedding algorithm. Optionally, there are carriers in at least two different formats having different watermark embedding algorithms.

Step 304. Embed an $i^{th}$ sub-watermark in the $i^{th}$ carrier of the composite file according to the watermark embedding algorithm corresponding to the format of the $i^{th}$ carrier.

Figure 5:
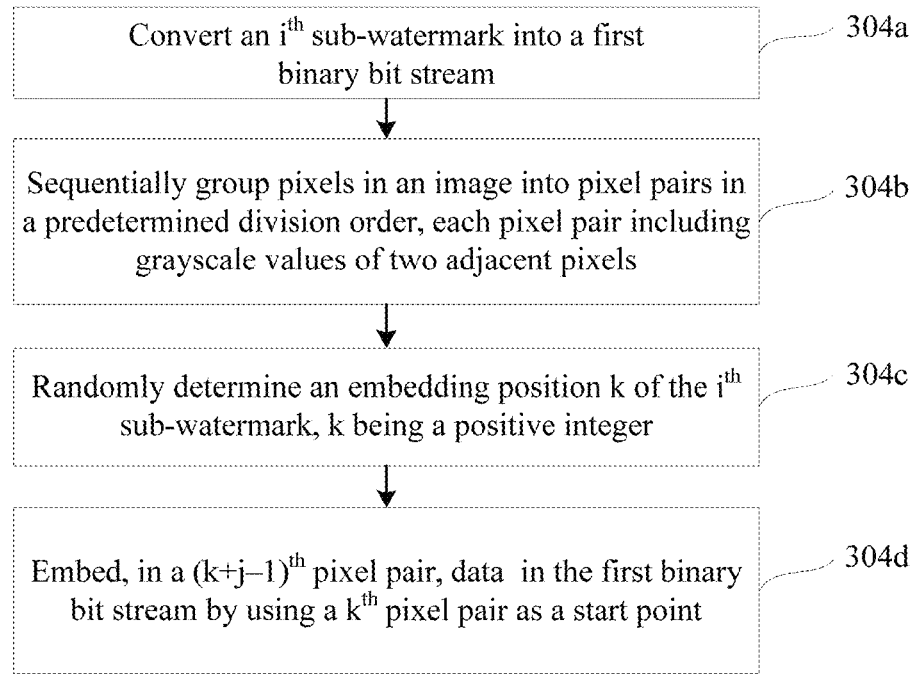
FIG. 5 is a flowchart of a watermark embedding algorithm in an image according to an exemplary embodiment of this application.

When the $i^{th}$ carrier is an image, refer to a watermark embedding algorithm shown in FIG. 5. When the $i^{th}$ carrier is a portable document format (PDF) document, refer to a watermark embedding algorithm shown in FIG. 6.

As shown in FIG. 5, when the $i^{th}$ carrier is an image, embedding the $i^{th}$ sub-watermark in the image may include the following steps:

Step 304a. Convert the $i^{th}$ sub-watermark into a first binary bit stream.

Because a digital watermark obtained through encryption by using the MD-5 algorithm is a 32-bit character string, a sub-watermark obtained through splitting is also a character string. The sub-watermark is binary converted to obtain a first binary bit stream.

A bit quantity of the first binary bit stream is n, n is a positive integer, $j^{th}$-bit data (or a $j^{th}$ bit) in the first binary bit stream is data $S_j$, a value of the data $S_j$ is 0 or 1, j is a positive integer, and $1 \leq j \leq n$.

For example, if the first binary bit stream is 1101, the first-bit data $S_1$ is 1, the second-bit data $S_2$ is 0, the third-bit data $S_3$ is 1, and the fourth-bit data $S_4$ is 1.

Step 304b. Sequentially group pixels in the image into pixel pairs in a predetermined division order, each pixel pair including grayscale values of two adjacent pixels.

Optionally, the predetermined division order is an order from left to right for the same pixel row and from top to bottom for different pixel rows. Alternatively, the predetermined division order is an order from top to bottom for the same pixel column and from left to right for different pixel columns. In addition to the foregoing two division orders, the predetermined division order may be determined by a technician according to a requirement during actual implementation.

Using the order from left to right for the same pixel column and from top to bottom for different pixel columns as an example, the first pixel and the second pixel in the first row are used as the first pixel pair, the third pixel and the fourth pixel in the first row are used as the second pixel pair, and so on. If a quantity of pixels in the first row is an odd number, the last pixel in the first row and the first pixel in the second row are used as a pixel pair.

Every two adjacent pixels in the image are grouped as a pixel pair, and each pixel pair is indicated by using grayscale values of pixels. A grayscale value refers to color depth of a pixel, and usually ranges from 0 to 255. For example, if a pixel pair is indicated as (x, y), x indicates a grayscale value of the former pixel in the pixel pair, and y indicates a grayscale value of the latter pixel in the pixel pair.

Step 304c. Randomly determine an embedding position k of the $i^{th}$ sub-watermark, k being a positive integer.

The embedding position k corresponds to a group number of a pixel pair.

During actual application, the embedding position k is usually determined according to a length of the first binary bit stream, to ensure that data of every bit in the first binary bit stream can be embedded in the image.

Step 304d. Embed, in a $(k+j-1)^{th}$ pixel pair, data $S_j$ in the first binary bit stream by using a $k^{th}$ pixel pair as a start point.

In a possible implementation, if several bits of data in the first binary bit stream are still not embedded after data in the first binary bit stream is embedded in the last pixel pair, the remaining bits of data are sequentially embedded in pixel pairs starting from the first pixel pair.

Optionally, the embedding, in a $(k+j-1)^{th}$ pixel pair, data $S_j$ in the first binary bit stream includes the following steps:

S1. Calculate an average value of and a difference between a first grayscale value and a second grayscale value in the $(k+j-1)^{th}$ pixel pair.

A grayscale value of the former pixel in each pixel pair is a first grayscale value, and a grayscale value of the latter pixel in each pixel pair is a second grayscale value.

When the first grayscale value is x and the second grayscale value is y, the average value of and the difference between the first grayscale value and the second grayscale value are calculated according to a formula (1):

$$\begin{cases} l = \text{floor}\left(\frac{x+y}{2}\right) \\ h = x - y \end{cases} \quad \text{formula (1)}$$

where l indicates the average value of the first grayscale value and the second grayscale value, h indicates the difference between the first grayscale value and the second grayscale value, and floor is a round-down function, for example if Z=floor(z), when z is 3.2, Z is equal to 3.

S2. Multiply the difference by 2, plus the data $S_j$ in the first binary bit stream, to obtain a target difference.

The target difference is calculated according to a formula (2):

$$h' = h \times 2 + S_j \quad \text{formula (2)}$$

where h indicates the difference, and h' indicates the target difference.

S3. Calculate a first target grayscale value and a second target grayscale value of the $(k+j-1)^{th}$ pixel pair by using the average value and the target difference, to obtain a $(k+j-1)^{th}$ target pixel pair.

The target difference h' obtained through calculation in S2 is substituted into the formula (1), and the average value l remains unchanged. A system of linear equations with two unknowns is obtained according to two equations in the formula (1). x' and y' are obtained by solving the system of linear equations with two unknowns, where x' is the first target grayscale value, y' is the second target grayscale value, and therefore, the target pixel pair is (x', y').

In an optional embodiment, each target pixel pair is calculated according to the steps shown in FIG. 5.

In an optional embodiment, target pixel pairs may be sequentially calculated in an order of serial execution, or target pixel pairs may be simultaneously calculated in an order of parallel execution.

Figure 6:
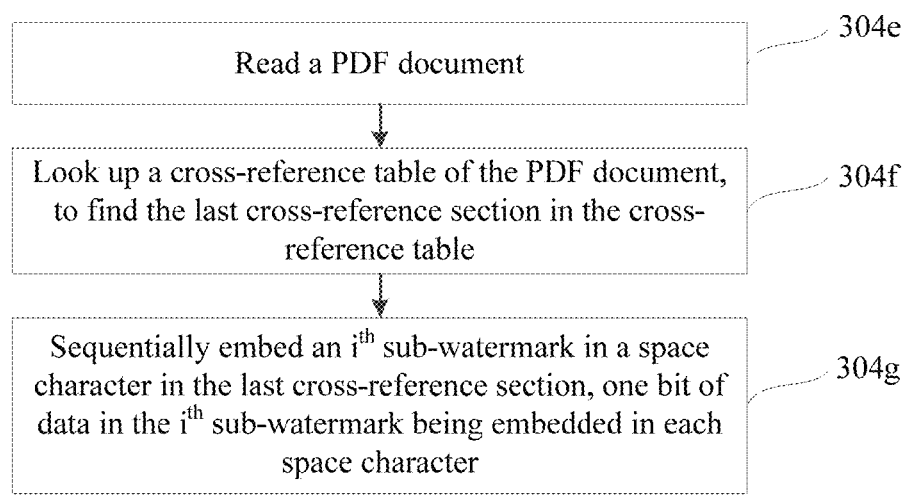
FIG. 6 is a flowchart of a watermark embedding algorithm in a PDF document according to an exemplary embodiment of this application.

As shown in FIG. 6, when the $i^{th}$ carrier is a PDF document, embedding the $i^{th}$ sub-watermark in the image may include the following steps:

Step 304e. Read the PDF document.

Reading the PDF document means reading the PDF document in a memory stream, and composition parts of the PDF document can be read.

The PDF document includes four parts: a file header, a file body, a cross-reference table, and a file trailer.

The file header is used for specifying a release number of a PDF standard with which the PDF file complies, and appears in the first row of the PDF file.

The file body includes a series of PDF indirect objects, and these indirect objects constitute specific content of the PDF document, including fonts, pages, images, and the like.

The cross-reference table is an indirect object address index table created for randomly accessing the indirect objects.

The file trailer is used to state an address of the cross-reference table, and specifies a root object of the file body.

Usually, one PDF document includes one file header, one file body, one cross-reference table, and one file trailer.

Step 304f. Look up a cross-reference table of the PDF document, to find the last cross-reference section in the cross-reference table.

Optionally, the PDF document is modified in an incremental manner. During generation, the PDF document has a set of a file header+a file body+a cross-reference table+a file trailer. If the PDF document is modified, a set of a file body+a cross-reference table+a file trailer is added below the file trailer in the first set, and if the PDF document is modified again, a set of a file body+a cross-reference table+a file trailer is added below the file trailer in the second set, and so on. It can be learned that the last set of a file body+a cross-reference table+a file trailer of the PDF document corresponds to PDF document content obtained after the last modification.

Searching the cross-reference table for the last cross-reference section means searching for a PDF document obtained after the last modification. The last cross-reference section is a cross-reference table in the last set of a file body+a cross-reference table+a file trailer of the PDF document. That is, the cross-reference section includes a set of a file header+a file body+a cross-reference table+a file trailer.

Step 304g. Sequentially embed the $i^{th}$ sub-watermark in space characters in the last cross-reference section, one bit of data in the $i^{th}$ sub-watermark being embedded in each space character.

The cross-reference table includes several cross-reference entries. Each cross-reference entry has a fixed format: nnnnnnnnnn ggggg n, and includes three parts: an offset address (nnnnnnnnnn), a code number (ggggg), a tag indicating whether the entry is used (which is n, n indicating that the entry is occupied, and f indicating the entry is free). There is a space character between the offset address and the code number. There is a space character between the code number and the tag indicating whether the entry is used. The space character is characterized in that writing any information in the space character of the cross-reference entry does not affect display of the PDF document.

In an optional embodiment, each digit of character of a sub-watermark, which is obtained through splitting, in a format of a character string may be directly embedded in a space character position. For example, the sub-watermark is gj65y6. From the first space character in the first cross-reference entry in the last cross-reference section, sequentially, g is written to the first space character, j is written to the second space character, 6 is written to the third space character, 5 is written to the fourth space character, y is written to the fifth space character, and 6 is written to the sixth space character.

Optionally, the sequentially embedding the $i^{th}$ sub-watermark in space characters in the last cross-reference section includes the following steps:

S4. Convert the $i^{th}$ sub-watermark into a second binary bit stream.

S5. Sequentially embed the second binary bit stream in space characters in the last cross-reference section, one bit of data in the second binary bit stream being embedded in each space character.

In another possible implementation of step 304g, the $i^{th}$ sub-watermark is first binary converted to obtain the second binary bit stream, and then all bits of data in the second binary bit stream are sequentially embedded in space character positions.

Step 305. Integrate N target carriers into a target file.

After the sub-watermarks are respectively embedded in the corresponding carriers, the target carriers are integrated into the target file according to a composite file generation manner.

The target file refers to a composite file carrying a digital watermark.

Step 306. Store related information of the digital watermark.

The related information of the digital watermark includes at least a correspondence between the digital watermark and the composite file, a generation rule of the digital watermark, a splitting rule of the digital watermark, and an embedding rule of the digital watermark.

Optionally, using an order file as an example, storing the correspondence between the digital watermark and the composite file means storing at least an order number and a digital watermark in correspondence with each other.

Corresponding to the foregoing MD-5 algorithm, storing the generation rule of the digital watermark means storing at least a random number or a GUID used for generating a digital watermark.

Storing the splitting rule of the digital watermark means storing at least a quantity of sub-watermarks obtained through splitting, a digit quantity of each sub-watermark, and a sequential order of the sub-watermarks in the digital watermark.

Corresponding to step 304c, storing the embedding rule of the digital watermark means storing at least the embedding position k. Optionally, after the sub-watermarks are binary converted, a bit quantity of a binary bit stream obtained through conversion is stored.

Figure 7:
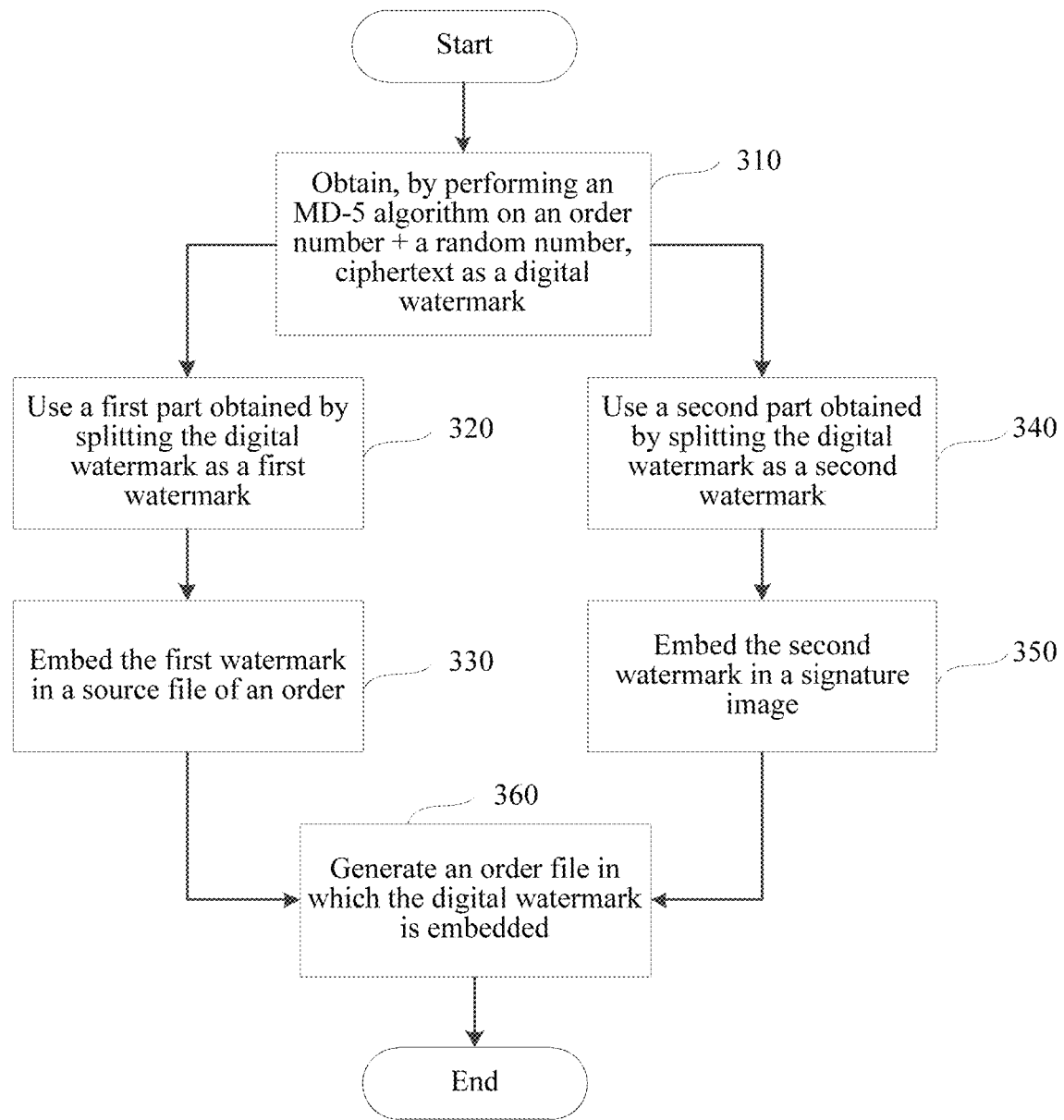
FIG. 7 is a flowchart of a digital watermark embedding method in an order file according to an exemplary embodiment of this application.

Optionally, when the composite file is an order file, and the order file includes a source file and a signature image, the digital watermark embedding algorithm provided in this embodiment may alternatively be indicated as a flowchart shown in FIG. 7. As shown in FIG. 7, step 310 is first performed to obtain "an order number+a random number", and ciphertext is obtained by performing the MD-5 algorithm on "the order number+the random number" and is used as a digital watermark. Then step 320 is performed to use a first part obtained by splitting the digital watermark as a first watermark. Then step 330 is performed to embed the first watermark in the source file of the order. As a branch after step 310, step 340 is performed to use a second part obtained by splitting the digital watermark as a second watermark. Step 350 is further performed to embed the second watermark in the signature image. Finally, according to step 330 and step 350, step 360 is performed to generate the order file in which the digital watermark is embedded.

It should be noted that this embodiment provides an algorithm for embedding a digital watermark in an image and a PDF document. For a carrier in another format, a proper watermark embedding algorithm may be specifically analyzed according to the format of the carrier. Details are not described again in this embodiment.

In conclusion, in the digital watermark embedding method provided in this embodiment of this application, a digital watermark is split into several sub-watermarks with the same quantity as carriers of a composite file, then an $i^{th}$ sub-watermark is embedded in an $i^{th}$ carrier of the composite file, to obtain an $i^{th}$ target carrier, and after all the sub-watermark are embedded, target carriers are integrated into a target file. For a composite file including at least two carriers, a part of the digital watermark is embedded in each carrier, so that all the carriers of the composite file are protected. Because only one digital watermark needs to be generated, and the sub-watermarks embedded in the carriers are associated, all the carriers of the composite file can be protected, thereby ensuring integrity of the composite file, and reducing the amount of computation and interactive operations in a digital watermark embedding process.

The method for embedding a sub-watermark in an image in step 304a to step 304d may be used to embed a sub-watermark in a binary format in some pixels in an image, and change grayscale values of some pixels. Use of such a method in a signature image can effectively prevent a correct signature image from being stolen.

The method for embedding a sub-watermark in a PDF document in step 304e to step 304g may be used to embed a sub-watermark in a format of a character string or a binary format in space characters in a cross-reference table by using features of the space characters in the cross-reference table of the PDF document, without affecting display of the PDF document, thereby maintaining correctness of content of the PDF document.

The related information of the digital watermark is stored in step 306, so that the correspondence between the digital watermark and the composite file can be stored. Therefore, during verification of the digital watermark, the correct digital watermark can be found according to the composite file. In addition, the generation rule, the splitting rule, and the embedding rule of the digital watermark are stored, so that during verification of the digital watermark, sub-watermarks embedded in carriers can be restored to obtain a complete digital watermark. Then the obtained digital watermark is compared with the correct digital watermark.

Figure 8:
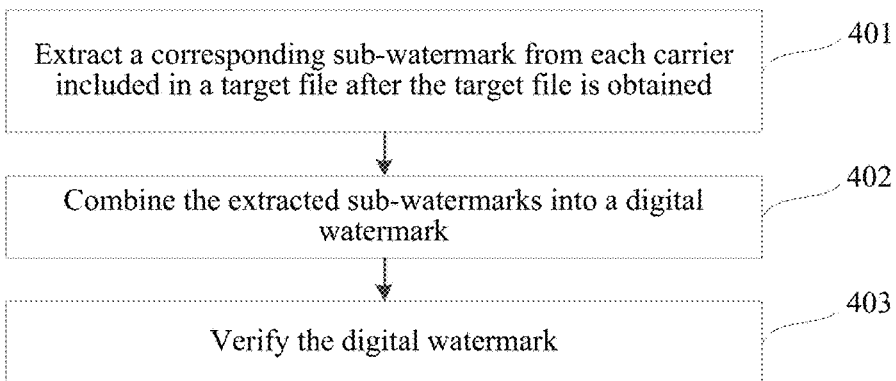
FIG. 8 is a method flowchart of a digital watermark extraction method according to an exemplary embodiment of this application.

FIG. 8 is a method flowchart of a digital watermark extraction method according to another embodiment of this application. For example, the digital watermark extraction method is applied to the service server 130 shown in FIG. 1. As shown in FIG. 8, the digital watermark extraction method may include the following steps:

Step 401. Extract a corresponding sub-watermark from each carrier included in a target file after the target file is obtained.

The web server 120 invokes the file server 150 to obtain the target file, and sends the target file to the service server 130, so that the service server 130 can obtain the target file.

The target file refers to a composite file carrying a digital watermark. The target file includes at least two carriers.

The sub-watermark is an implicit identifier embedded in the corresponding carrier.

Step 402. Combine the extracted sub-watermarks into a digital watermark.

The digital watermark is an implicit identifier embedded in the target file. Each sub-watermark corresponds to partial content of the digital watermark.

Because the target file includes a plurality of carriers and a sub-watermark is embedded in each carrier, sub-watermarks of all the carriers need to be extracted to obtain a complete digital watermark in which the target file is embedded.

Step 403. Verify the digital watermark.

The service server 130 compares the extracted digital watermark with a correct digital watermark stored in the database server 140 and corresponding to the target file, to determine whether the extracted digital watermark is correct, thereby determining whether the target file has been tampered with.

Figure 9:
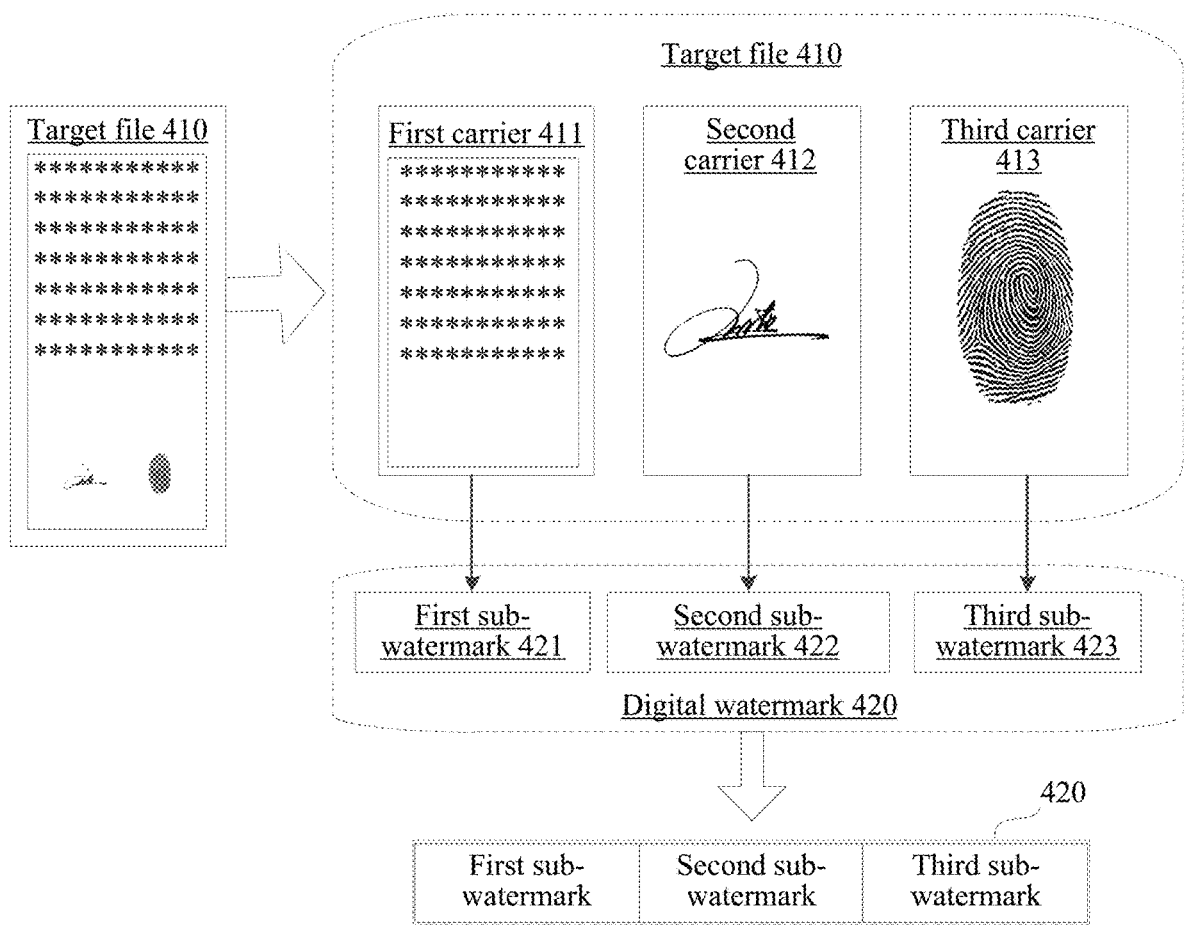
FIG. 9 is a schematic diagram of a digital watermark extraction method according to an exemplary embodiment of this application.

The following describes the embodiment involved in FIG. 8 by using a schematic diagram of extracting a digital watermark shown in FIG. 9. As shown in FIG. 9, a target file 410 includes a first carrier 411, a second carrier 412, and a third carrier 413, a first sub-watermark 421 is extracted from the first carrier 411, a second sub-watermark 422 is extracted from the second carrier 412, a third sub-watermark 423 is extracted from the third carrier 413, and the first sub-watermark 421, the second sub-watermark 422, and the third sub-watermark 423 are spliced to obtain a digital watermark 420.

In conclusion, in the digital watermark extraction method provided in this embodiment of this application, a corresponding sub-watermark is extracted from each carrier of a composite file, and then the sub-watermarks are combined into a digital watermark for verification, so that it can be detected whether the composite file has been tampered with, or it can be detected whether a part of the composite file has been tampered with, thereby resolving a problem in the existing technology that integrity of a composite file cannot be ensured because digital watermarks in carriers need to be separately verified. In addition, because the sub-watermarks are associated, only the digital watermark finally obtained through combination needs to be verified, and it can be quickly determined whether the composite file or a part of the composite file has been tampered with, thereby ensuring integrity of the composite file and reducing the amount of computation and interactive operations during verification of the digital watermark in the composite file.

Figure 10:
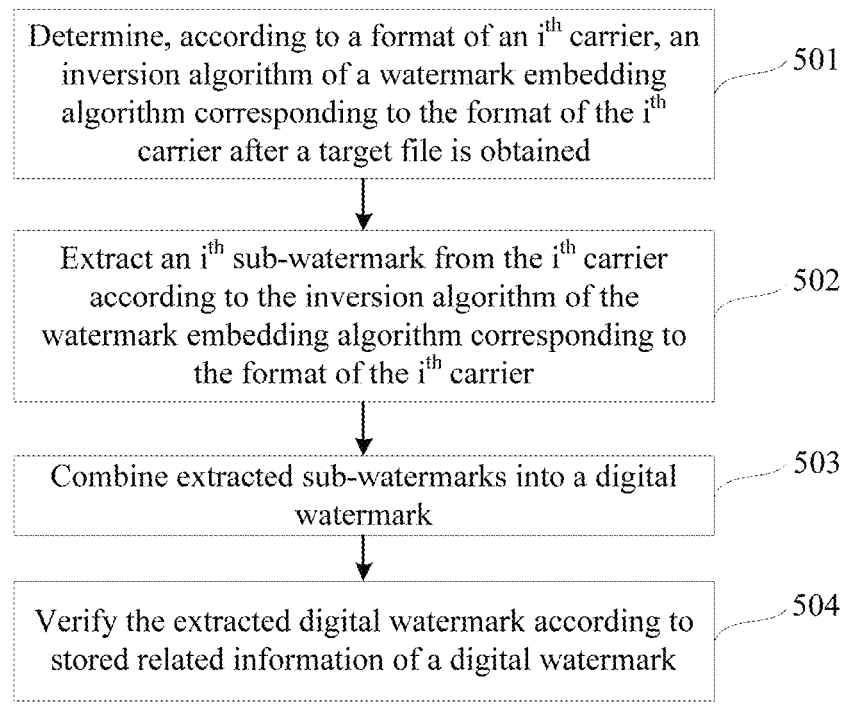
FIG. 10 is a method flowchart of a digital watermark extraction method according to another exemplary embodiment of this application.

FIG. 10 is a method flowchart of a digital watermark extraction method according to another embodiment of this application. For example, the digital watermark extraction method is applied to the service server 130 shown in FIG. 1. As shown in FIG. 10, the digital watermark extraction method may include the following steps:

Step 501. Determine, according to a format of an $i^{th}$ carrier, an inversion algorithm of a watermark embedding algorithm corresponding to the format of the $i^{th}$ carrier after a target file is obtained.

The target file includes N carriers, N is a positive integer, N>1, i is a positive integer, and $1 \leq i \leq N$.

The web server 120 invokes the file server 150 to obtain the target file, and sends the target file to the service server 130, so that the service server 130 can obtain the target file.

The carriers are of different types, that is, the carriers are in different formats, and the carriers in the different formats may correspond to different watermark embedding algorithms. Therefore, during exaction of watermarks from carriers in different formats, an inversion algorithm of a corresponding watermark embedding algorithm needs to be determined according to a format of a carrier. Optionally, any two carriers in different formats may correspond to different watermark embedding algorithms or inversion algorithms. Optionally, at least two carriers in different formats may correspond to different watermark embedding algorithms or inversion algorithms.

Step 502. Extract an $i^{th}$ sub-watermark from the $i^{th}$ carrier according to the inversion algorithm of the watermark embedding algorithm corresponding to the format of the $i^{th}$ carrier.

Figure 11:
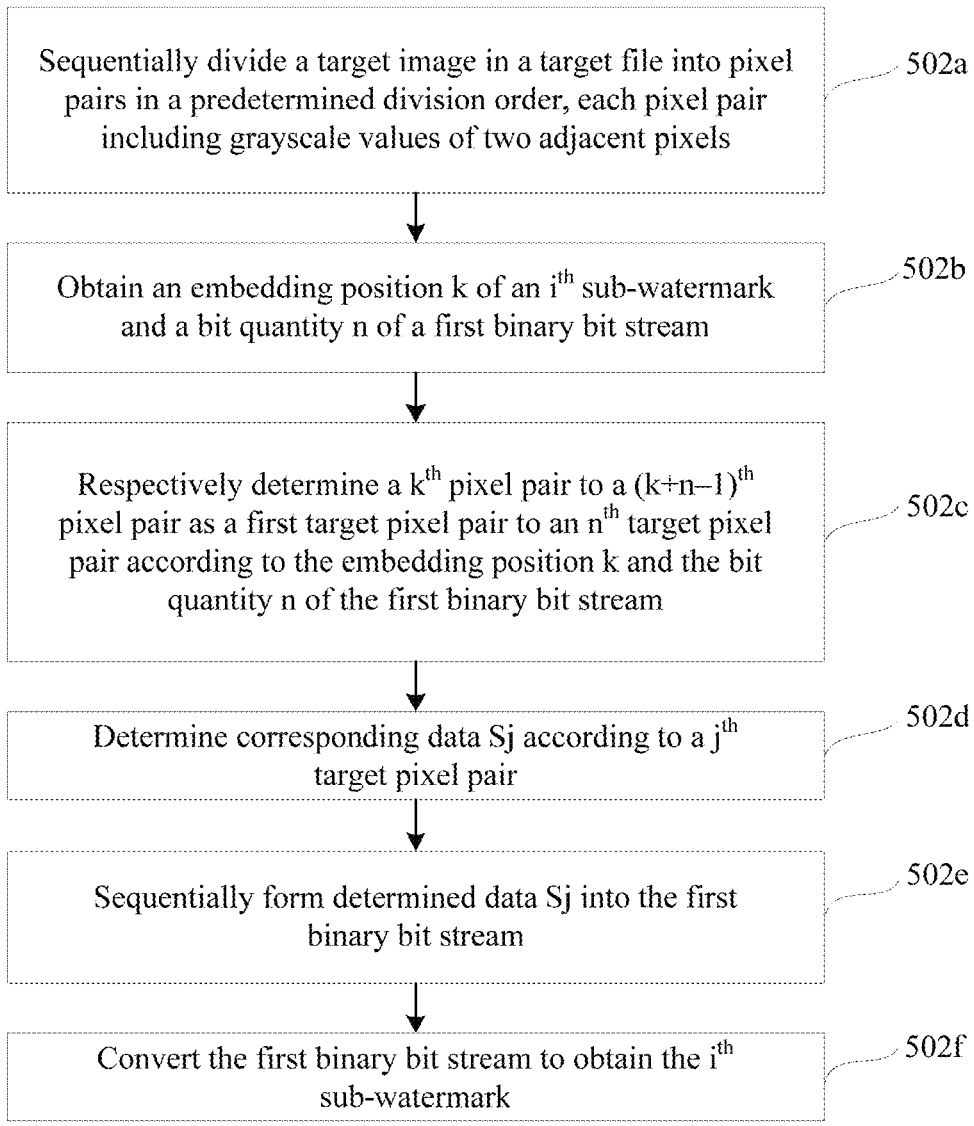
FIG. 11 is a flowchart of a digital watermark extraction algorithm in an image according to an exemplary embodiment of this application.

When the $i^{th}$ carrier is an image, refer to a watermark extraction algorithm shown in FIG. 11. When the $i^{th}$ carrier is a PDF document, refer to a watermark extraction algorithm shown in FIG. 12.

As shown in FIG. 11, when the $i^{th}$ carrier is an image, extracting the $i^{th}$ sub-watermark from the image may include the following steps:

502a. Sequentially divide a target image in the target file into pixel pairs in a predetermined division order, each pixel pair including grayscale values of two adjacent pixels.

Optionally, the predetermined division order is an order from left to right for the same pixel row and from top to bottom for different pixel rows. Alternatively, the predetermined division order is an order from top to bottom for the same pixel column and from left to right for different pixel columns. In addition to the foregoing two division orders, the predetermined division order may be determined by a technician according to a requirement during actual implementation.

It should be noted that the predetermined division order in a digital watermark embedding process is the same as the predetermined division order in the digital watermark extraction process.

502b. Obtain an embedding position k of the $i^{th}$ sub-watermark and a bit quantity n of a first binary bit stream.

The first binary bit stream is obtained by converting the $i^{th}$ sub-watermark, the embedding position k is randomly determined, k is a positive integer, and n is a positive integer.

Because the database server 140 stores related information of a digital watermark, the service server 130 can obtain the related information of the digital watermark from the database server 140. The related information includes the embedding position k of the $i^{th}$ sub-watermark and the bit quantity n of the first binary bit stream.

502c. Respectively determine a $k^{th}$ pixel pair to a $(k+n-1)^{th}$ pixel pair as a first target pixel pair to an $n^{th}$ target pixel pair according to the embedding position k and the bit quantity n of the first binary bit stream.

Because the pixel pairs are divided in the same predetermined division order, after obtaining the embedding position k, the service server 130 can find the corresponding $k^{th}$ pixel pair according to the embedding position k, and then can find, according to the bit quantity n of the first binary bit stream, each target pixel pair in which the $i^{th}$ sub-watermark is embedded.

502d. Determine corresponding data $S_j$ according to a $j^{th}$ target pixel pair.

The data $S_j$ is $j^{th}$-bit data in the first binary bit stream, j is a positive integer, and $1 \le j \le n$.

During embedding, each bit of data in the first binary bit stream is embedded to one pixel pair. Therefore, the service server 130 can extract one bit of data in the first binary bit stream from the target pixel pair.

Optionally, the determining corresponding data $S_j$ according to a $j^{th}$ target pixel pair may include the following steps:

S6. Calculate a difference between a first target grayscale value and a second target grayscale value of the $j^{th}$ target pixel pair.

Assuming that in the determined $j^{th}$ target pixel pair, the first target grayscale value is x and the second target grayscale value is y, the difference h between the first target grayscale value and the second target grayscale value is h=x−y.

S7. Determine a lowest bit of data of a binary representation of the difference as the corresponding data $S_j$.

The difference h is converted into a binary representation. If the last bit of data is 0, the determined data $S_j$ is equal to 0. If the last bit of data is 1, the determined data $S_j$ is equal to 1.

Optionally, because during embedding, a target difference is obtained by multiplying a difference by 2 and then plus $S_j$, if the difference h is an odd number, it indicates that the data $S_j$ is equal to 1, and if the difference is an even number, it indicates that the data $S_j$ is equal to 0.

Optionally, if the target image needs to be restored to an image before the digital watermark is embedded, according to the formula (1), an average value l of x and y is first calculated, then the difference h is divided by 2 to obtain a result, and the result is rounded down to obtain a difference h'. The difference h' and the average value l are substituted into the formula (1) to solve a system of linear equations with two unknowns, to obtain a first grayscale value x' and a second grayscale value y'. In this case, (x', y') is a grayscale value of a $j^{th}$ pixel pair before a digital watermark is embedded.

502e. Sequentially form determined data $S_j$ into the first binary bit stream.

The data $S_j$ is combined into a digit sequence including 0 and 1 in an order of pixel pairs corresponding to the extracted data $S_j$. The digit sequence is a first binary bit stream.

502f. Convert the first binary bit stream to obtain the $i^{th}$ sub-watermark.

Because the first binary bit stream is obtained by binary converting the $i^{th}$ sub-watermark, step 502f is a process of the inversion algorithm.

Figure 12:
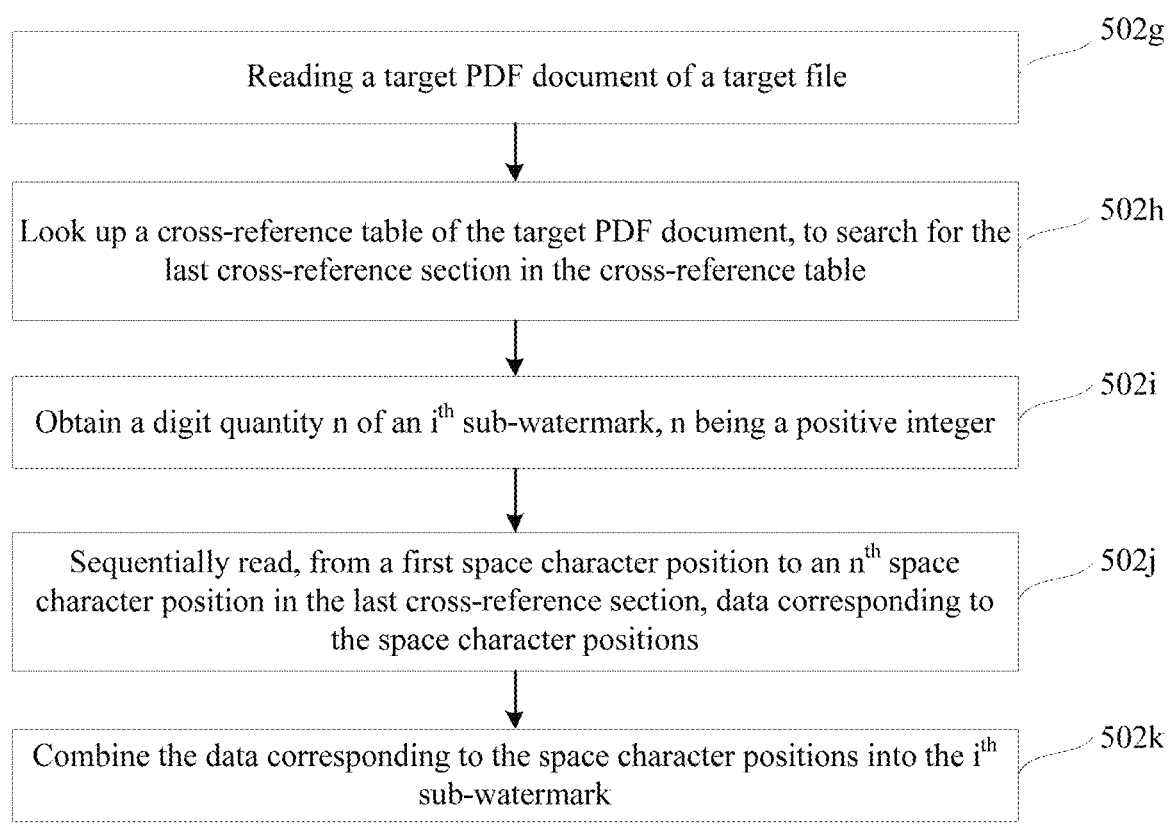
FIG. 12 is a flowchart of a digital watermark extraction algorithm in a PDF document according to an exemplary embodiment of this application.

As shown in FIG. 12, when the $i^{th}$ carrier is an PDF document, extracting the $i^{th}$ sub-watermark from the image may include the following steps:

Step 502g. Read a target PDF document of the target file.

Reading the target PDF document means reading the target PDF document in a memory stream, and composition parts of the target PDF document can be read.

Step 502h. Look up a cross-reference table of the target PDF document, to search for the last cross-reference section in the cross-reference table.

The last cross-reference section corresponds to content of a PDF document after the last modification.

In a possible implementation, if the PDF document is modified after a sub-watermark is embedded, and a space character position in the last cross-reference section is not replaced, it is quickly determined that the PDF document has been tampered with.

Step 502i. Obtain a digit quantity n of the $i^{th}$ sub-watermark, n being a positive integer.

The service server 130 can obtain the digit quantity n of the $i^{th}$ sub-watermark from the related information of the digital watermark that is stored in the database server 140.

Optionally, if the $i^{th}$ sub-watermark is embedded after being converted into a second binary bit stream, a binary digit quantity n of the second binary bit stream is obtained.

Step 502j. Sequentially read, from a first space character position to an $n^{th}$ space character position in the last cross-reference section, data corresponding to the space character positions.

Optionally, if the sub-watermark is written in the last cross-reference section starting from the first space character position, the service server 130 directly reads the last cross-reference section from the first space character position during execution.

Optionally, if the sub-watermark is written in the last cross-reference section starting from a specified position, the service server 130 obtains the specified position from the database server 140, and reads the last cross-reference section from the specified position.

Step 502k. Combine the data corresponding to the space character positions into the $i^{th}$ sub-watermark.

The service server 130 combines the extracted data into the $i^{th}$ sub-watermark in a sequential order of extraction of the data, or in a sequential order of the space character positions corresponding to the data.

Optionally, if the $i^{th}$ sub-watermark is embedded after being converted into a second binary bit stream, the combining the data corresponding to the space character positions into the $i^{th}$ sub-watermark includes the following steps:

S8. Combine the data corresponding to the space character positions into the second binary bit stream.

After obtaining a bit quantity n of the second binary bit stream, the service server 130 obtains the data from the corresponding space character positions at a time, to form the second binary bit stream.

S9. Convert the second binary bit stream to obtain the $i^{th}$ sub-watermark.

Because the second binary bit stream is obtained by binary converting the $i^{th}$ sub-watermark, the inversion algorithm needs to be performed after the second binary bit stream is obtained.

Step 503. Combine extracted sub-watermarks into a digital watermark.

The service server 130 combines the sub-watermarks extracted from carriers into a complete digital watermark in a predetermined order according to related information of the digital watermark that is stored in the database server 140.

Step 504. Verify the extracted digital watermark according to stored related information of a digital watermark.

The related information of the digital watermark includes at least a correspondence between the digital watermark and the target file, a generation rule of the digital watermark, a splitting rule of the digital watermark, and an embedding rule of the digital watermark.

Optionally, the extracted digital watermark may be verified in the following two manners:

s1. Search for, according to the stored correspondence between the digital watermark and the target file, a stored digital watermark corresponding to the obtained target file, and verify whether the stored digital watermark is the same as the extracted digital watermark.

Using an order file as an example, in a digital watermark embedding process, a digital watermark and an order number are stored in correspondence with each other. In this case, during verification of the digital watermark, the service server 130 searches, according to the order number, the database server 140 for the corresponding digital watermark, and then compares an extracted digital watermark with a stored digital watermark to determine whether the two are the same.

s2. Obtain the stored generation rule of the digital watermark, generate a corresponding digital watermark according to the obtained target file, and verify whether the generated digital watermark is the same as the extracted digital watermark.

For an MD-5 algorithm, the order file is still used as an example. The service server 130 generates a character string according to the order number of the order file and a stored random number or GUID by using the MD-5 algorithm, use the character string as a generated digital watermark, and compare the generated digital watermark with the extracted digital watermark, to determine whether the two are the same.

When the extracted digital watermark is the same as the stored digital watermark, or when the extracted digital watermark is the same as the generated digital watermark, it indicates that the target file has not been tampered with.

When the extracted digital watermark is different from the stored digital watermark, or when the extracted digital watermark is different from the generated digital watermark, it indicates that the target file has been tampered with.

Figure 13:
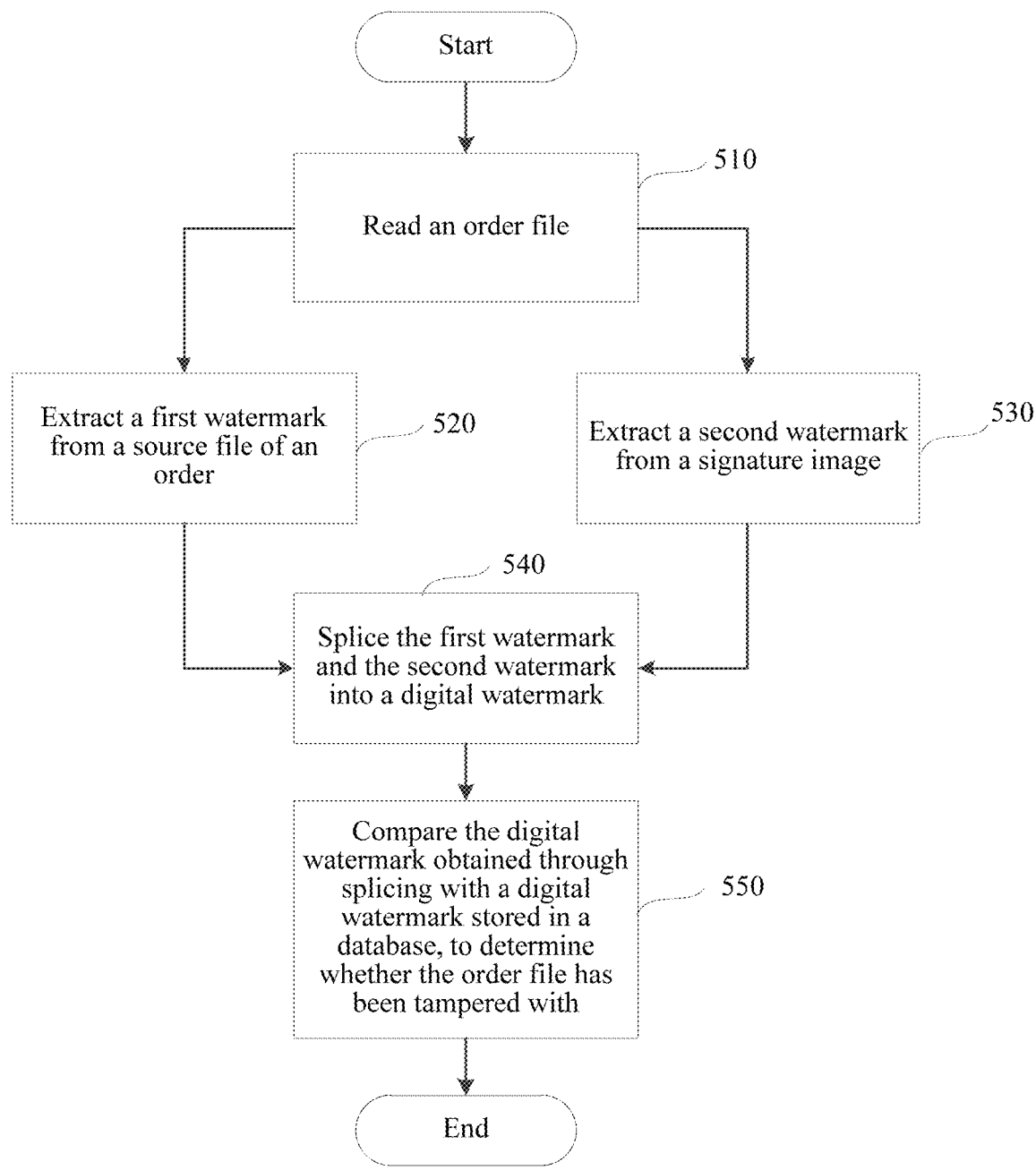
FIG. 13 is a flowchart of a digital watermark extraction method according to an exemplary embodiment of this application.

When the target file is an order file, and the order file includes a source file and a signature image, the digital watermark extraction algorithm provided in this embodiment may alternatively be indicated as a flowchart shown in FIG. 13. As shown in FIG. 13, step 510 is first performed to read the order file. Then step 520 is performed to extract a first watermark from the source file of an order, and step 530 is performed to extract a second watermark from the signature image. Step 540 is further performed to splice the first watermark and the second watermark into a digital watermark. Finally, step 550 is performed to compare the digital watermark obtained through splicing with a digital watermark stored in a database, to determine whether the order file has been tampered with.

In conclusion, in the digital watermark extraction method provided in this embodiment of this application, a corresponding sub-watermark is extracted from each carrier of a composite file, and then the sub-watermarks are combined into a digital watermark for verification, so that it can be detected whether the composite file has been tampered with, or it can be detected whether a part of the composite file has been tampered with, thereby resolving a problem in the existing technology that integrity of a composite file cannot be ensured because digital watermarks in carriers need to be separately verified. In addition, because the sub-watermarks are associated, only the digital watermark finally obtained through combination needs to be verified, and it can be quickly determined whether the composite file or a part of the composite file has been tampered with, thereby ensuring integrity of the composite file and reducing the amount of computation and interactive operations during verification of the digital watermark in the composite file.

The method for extracting a sub-watermark from an image in step 502*a* to step 502*f* may be used to extract a part of a digital watermark embedded in an image, and further restore, according to an inversion algorithm of a watermark embedding algorithm, a target image to an image before a sub-watermark is embedded. In this way, the image is protected from being stolen during file transmission, and the target image can be restored to the original image, thereby avoiding an image distortion.

The method for extracting a sub-watermark from a PDF document in step 502*g* to step 502*k* may be used to extract a part of a digital watermark embedded in the PDF document. In addition, because a sub-watermark is embedded in the last cross-reference section of a cross-reference table of the PDF document, when the PDF document is modified, no sub-watermark can be extracted from the last cross-reference section, so that it is quickly determined that the PDF document has been tampered with.

The extracted digital watermark is verified in step 504, so that it can be determined whether the extracted digital watermark is the same as the stored digital watermark, thereby determining whether the target file has been tampered with, and ensuring validity of the target file. In addition, the digital watermark is generated according to the stored generation rule of the digital watermark and according to identification information that is not easily modified in the target file, and the extracted digital watermark is compared with the generated digital watermark, so that it can also be determined whether the target file has been tampered with.

Figure 14:
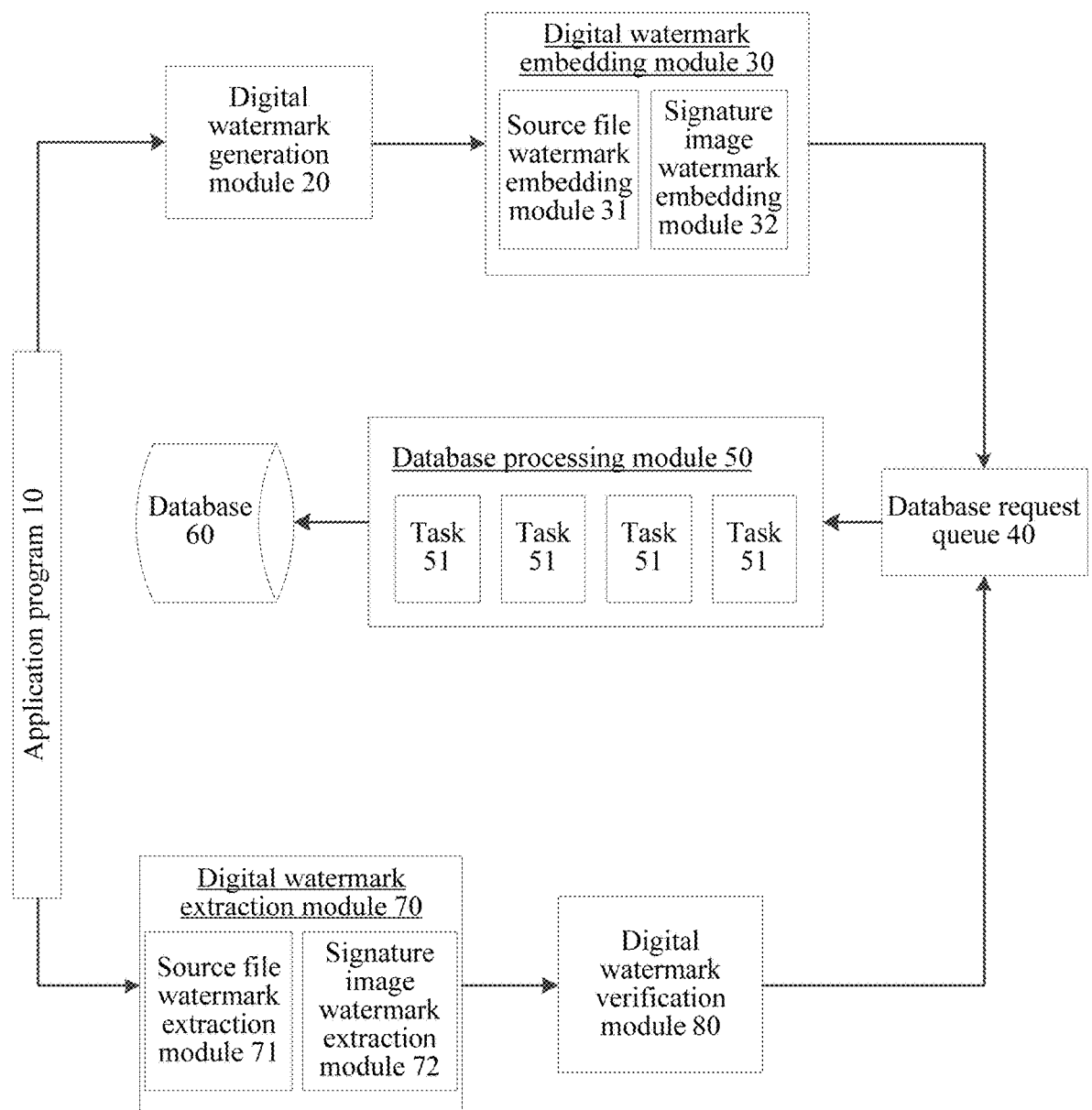
FIG. 14 is a schematic structural diagram of a system used for processing an order file according to an exemplary embodiment of this application.

With reference to the foregoing embodiment, an order file is used as an example, and a system used for processing the order file is shown in FIG. 14. FIG. 14 is a schematic structural diagram of a system for processing an order file according to an embodiment of this application. As shown in FIG. 14, in a digital watermark embedding process, an application program 10 sends a request to a digital watermark generation module 20, and the digital watermark generation module 20 generates a digital watermark and then sends the digital watermark to a digital watermark embedding module 30. The digital watermark embedding module 30 includes a source file watermark embedding module 31 and a signature image watermark embedding module 32. The digital watermark embedding module 30 sends an operation request for a database to a database request queue 40. A database processing module 50 creates a corresponding task 51 for the request in the database request queue 40. The task 51 is performing a write operation on a database 60. In a digital watermark extraction process, the application program 10 sends a request to a digital watermark extraction module 70. The digital watermark extraction module 70 includes a source file watermark extraction module 71 and a signature image watermark extraction module 72. After extracting a digital watermark, the digital watermark extraction module 70 sends the extracted digital watermark to a digital watermark verification module 80. The digital watermark verification module 80 sends an operation request for a database to the database request queue 40. The database processing module 50 creates a corresponding task 51 for the request in the database request queue 40. The task 51 is performing a read operation on the database 60.

Figure 15:
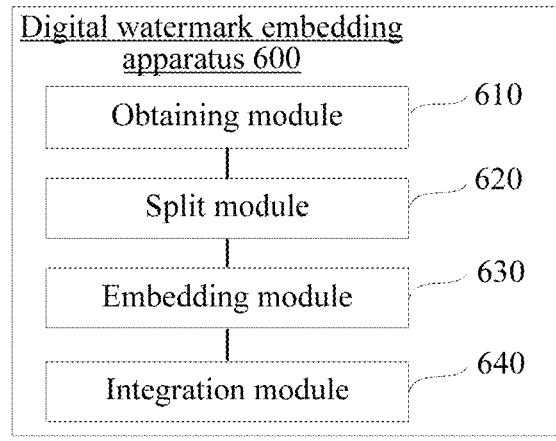
FIG. 15 is a structural block diagram of a digital watermark embedding apparatus according to an exemplary embodiment of this application.

FIG. 15 is a structural block diagram of a digital watermark embedding apparatus according to an embodiment of this application. For example, the digital watermark embedding apparatus 600 is applied to the service server 130 shown in FIG. 1. As shown in FIG. 15, the digital watermark embedding apparatus 600 may include an obtaining module 610, a split module 620, an embedding module 630, and an integration module 640.

The obtaining module 610 is configured to implement step 201, step 301, and any other implicit or public function related to obtaining.

The split module 620 is configured to implement step 202, step 302, and any other implicit or public function related to splitting.

The embedding module 630 is configured to implement step 203 and any other implicit or public function related to embedding.

The integration module 640 is configured to implement step 204, step 305, and any other implicit or public function related to integration.

Optionally, the embedding module 630 includes a determining unit and an embedding unit.

The determining unit is configured to implement step 303 and any other implicit or public function related to determining.

The embedding unit is configured to implement step 304, step 304$a$, step 304$b$, step 304$c$, step 304$d$, step 304$e$, step 304$f$, step 304$g$, step S1, step S2, step S3, step S4, step S5, and any other implicit or public function related to embedding.

Optionally, the digital watermark embedding apparatus 600 further includes a storage module.

The storage module is configured to implement step 306 and any other implicit or public function related to storage.

In conclusion, according to the digital watermark embedding apparatus provided in this embodiment of this application, a digital watermark is split into several sub-watermarks with the same quantity as carriers of a composite file, then an $i^{th}$ sub-watermark is embedded in an $i^{th}$ carrier of the composite file, to obtain an $i^{th}$ target carrier, and after all the sub-watermark are embedded, target carriers are integrated into a target file. For a composite file including at least two carriers, a part of the digital watermark is embedded in each carrier, so that all the carriers of the composite file are protected. Because only one digital watermark needs to be generated, and the sub-watermarks embedded in the carriers are associated, all the carriers of the composite file can be protected, thereby ensuring integrity of the composite file, and reducing the amount of computation and interactive operations in a digital watermark embedding process.

It should be noted that when the digital watermark embedding apparatus provided in the foregoing embodiment embeds a digital watermark, description is provided only by using an example of division of the foregoing functional modules. During actual application, the foregoing functions may be allocated to different functional modules according to requirements. That is, the internal structure of the service server is divided into different functional modules, to implement all or some of the functions described above. In addition, the digital watermark embedding apparatus provided in the foregoing belongs to the same concept as the embodiment of the digital watermark embedding method.

For a specific implementation process of the apparatus, refer to the method embodiment. Details are not described herein again.

Figure 16:
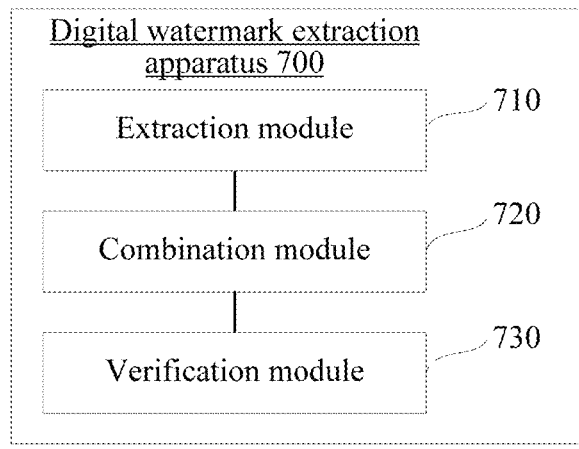
FIG. 16 is a structural block diagram of a digital watermark extraction apparatus according to an exemplary embodiment of this application.

FIG. 16 is a structural block diagram of a digital watermark extraction apparatus according to an embodiment of this application. For example, the digital watermark extraction apparatus 700 is applied to the service server 130 shown in FIG. 1. As shown in FIG. 16, the digital watermark extraction apparatus 700 may include an extraction module 710, a combination module 720, and a verification module 730.

The extraction module 710 is configured to implement step 401 and any other implicit or public function related to extraction.

The combination module 720 is configured to implement step 402, step 503, and any other implicit or public function related to combination.

The verification module 730 is configured to implement step 403, step 504, and any other implicit or public function related to verification.

Optionally, the extraction module 710 includes a determining unit and an extraction unit.

The determining unit is configured to implement step 501 and any other implicit or public function related to determining.

The extraction unit is configured to implement step 502, step 502$a$, step 502$b$, step 502$c$, step 502$d$, step 502$e$, step 502$f$, step 502$g$, step 502$h$, step 502$i$, step 502$j$, step 502$k$, step S6, step S7, step S8, step S9, and any other implicit or public function related to extraction.

Optionally, the verification module 730 includes a first verification unit and a second verification unit.

The first verification unit is configured to implement step s1 and any other implicit or public function related to verification.

The second verification unit is configured to implement step s2 and any other implicit or public function related to verification.

In conclusion, according to the digital watermark extraction apparatus provided in this embodiment of this application, a corresponding sub-watermark is extracted from each carrier of a composite file, and then the sub-watermarks are combined into a digital watermark for verification, so that it can be detected whether the composite file has been tampered with, or it can be detected whether a part of the composite file has been tampered with, thereby resolving a problem in the existing technology that integrity of a composite file cannot be ensured because digital watermarks in carriers need to be separately verified. In addition, because the sub-watermarks are associated, only the digital watermark finally obtained through combination needs to be verified, and it can be quickly determined whether the composite file or a part of the composite file has been tampered with, thereby ensuring integrity of the composite file and reducing the amount of computation and interactive operations during verification of the digital watermark in the composite file.

It should be noted that when the digital watermark extraction apparatus provided in the foregoing embodiment extracts a digital watermark, description is provided only by using an example of division of the foregoing functional modules. During actual application, the foregoing functions may be allocated to different functional modules according to requirements. That is, the internal structure of the service server is divided into different functional modules, to implement all or some of the functions described above. In addition, the digital watermark extraction apparatus provided in the foregoing belongs to the same concept as the embodiment of the digital watermark extraction method. For a specific implementation process of the apparatus, refer to the method embodiment. Details are not described herein again.

Figure 17:
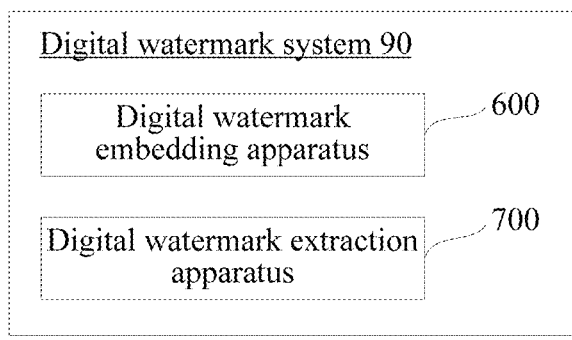
FIG. 17 is a structural block diagram of a digital watermark system according to an exemplary embodiment of this application.

FIG. 17 is a structural block diagram of a digital watermark system according to an embodiment of this application. As shown in FIG. 17, the digital watermark system 90 includes the digital watermark embedding apparatus 600 and the digital watermark extraction apparatus 700.

The digital watermark embedding apparatus 600 includes the structure shown in FIG. 15. The digital watermark extraction apparatus 700 includes the structure shown in FIG. 16.

Figure 18:
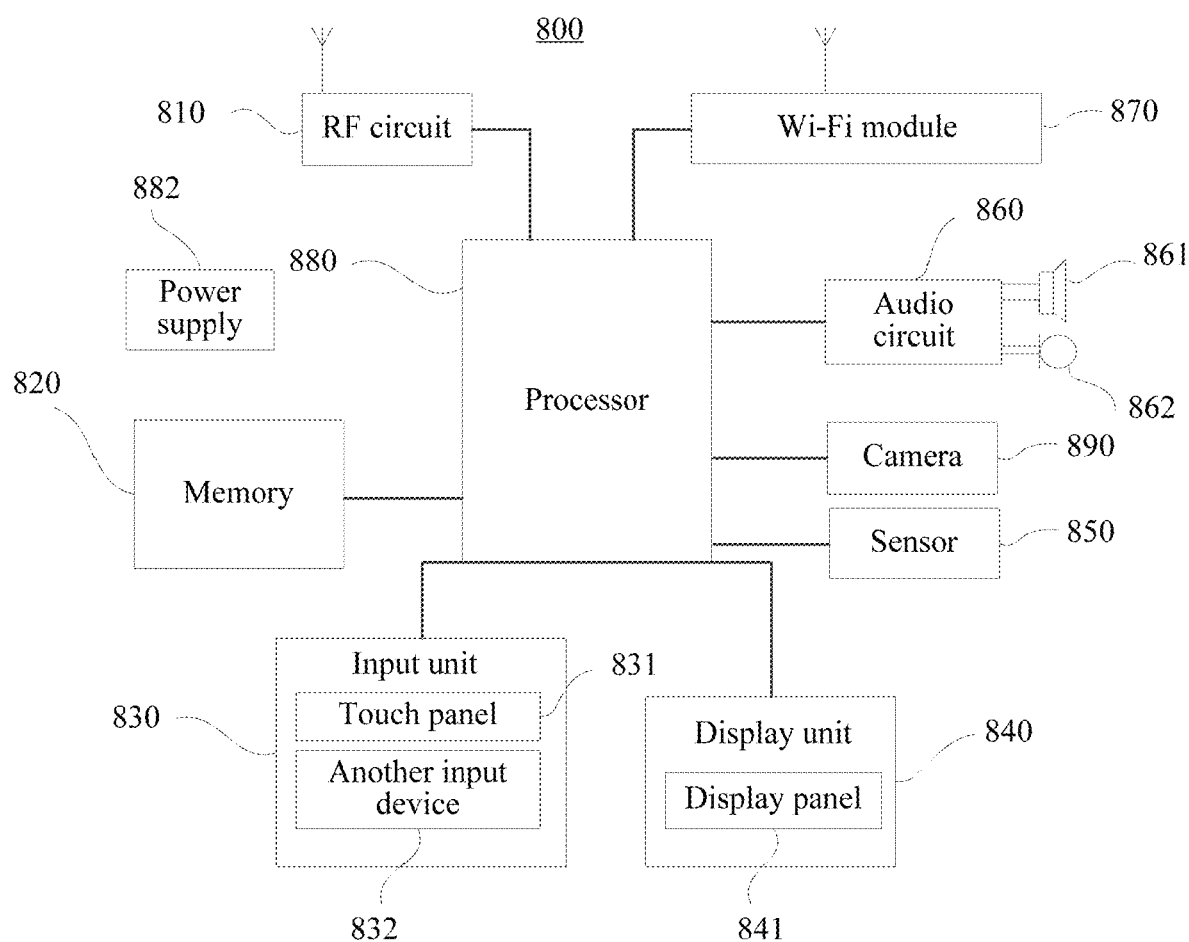
FIG. 18 is a structural block diagram of a terminal according to an exemplary embodiment of this application.

FIG. 18 is a structural block diagram of a terminal according to some embodiments of this application. The terminal 800 is configured to implement the digital watermark embedding method and the digital watermark extraction method provided in the foregoing embodiments. The terminal 800 in this application may include one or more components as follows: a processor configured to execute a computer program instruction to complete various processes and methods, a random access memory (RAM) and a read-only memory (ROM) that are configured to store information and a program instruction, a memory configured to store data and information, an I/O device, an interface, an antenna, or the like. Specifically:

The terminal 800 may include components such as a radio frequency (RF) circuit 810, a memory 820, an input unit 830, a display unit 840, a sensor 850, an audio circuit 860, a wireless fidelity (Wi-Fi) module 870, a processor 880, a power supply 882, and a camera 890. A person skilled in the art may understand that the structure of the terminal shown in FIG. 18 does not constitute a limitation to the terminal, and the terminal may include more components or fewer components than those shown in the figure, or some components may be combined, or a different component deployment may be used.

The following makes specific introduction of components of the terminal 800 with reference to FIG. 18.

The RF circuit 810 may be configured to receive and send signals during an information receiving and sending process or a call process. Specifically, the RF circuit 810 receives downlink information from a base station, then delivers the downlink information to the processor 880 for processing, and sends related uplink data to the base station. Usually, the RF circuit includes, but is not limited to, an antenna, at least one amplifier, a transceiver, a coupler, a low noise amplifier (LNA), and a duplexer. In addition, the RF circuit 810 may also communicate with a network and another device through wireless communication. The wireless communication may use any communication standard or protocol, including but not limited to: Global System for Mobile Communications (GSM), General Packet Radio Service (GPRS), Code Division Multiple Access (CDMA), Wideband Code Division Multiple Access (WCDMA), Long Term Evolution (LTE), email, and a short message service (SMS).

The memory 820 may be configured to store a software program and module. The processor 880 runs the software program and module stored in the memory 820, to perform various functional applications and data processing of the terminal 800. The memory 820 may mainly include a program storage area and a data storage area. The program storage area may store an operating system, an application program required by at least one function (such as a sound playback function and an image display function), and the like. The data storage area may store data (such as audio data and an address book) created according to the use of the terminal 800, and the like. In addition, the memory 820 may include a high speed random access memory, and may also include a non-volatile memory, such as at least one magnetic disk storage device, a flash memory, or another volatile solid-state storage device.

The input unit 830 may be configured to receive input digit or character information, and generate a keyboard input signal related to the user setting and function control of the terminal 800. Specifically, the input unit 830 may include a touch panel 831 and another input device 832. The touch panel 831, also referred to as a touchscreen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 880. In addition, the touch controller can receive a command sent by the processor 880 and execute the command. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various menus of the terminal 800. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, to determine a type of a touch event. Then, the processor 880 provides a corresponding visual output on the display panel 841 according to the type of the touch event. Although in FIG. 18, the touch panel 831 and the display panel 841 are used as two separate parts to implement input and output functions of the terminal 800, in some embodiments, the touch panel 831 and the display panel 841 may be integrated to implement the input and output functions of the terminal 800.

The terminal 800 may further include at least one sensor 850, such as a gyro sensor, a magnetic induction sensor, an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the terminal 800 is moved to the ear. As one type of motion sensor, an acceleration sensor may detect magnitude of accelerations in various directions (which generally are triaxial), may detect magnitude and a direction of the gravity when static, and may be configured to identify an application of an electronic device gesture (such as switchover between horizontal and vertical screens, a related game, and gesture calibration of a magnetometer), a related function of vibration identification (such as a pedometer and a knock). Other sensors, such as a barometer, a hygrometer, a thermometer, and an infrared sensor, that may be configured in the terminal 800 are not further described herein.

The audio circuit 860, a speaker 861, and a microphone 862 may provide audio interfaces between the user and the terminal 800. The audio circuit 860 may convert received audio data into an electrical signal and transmit the electrical signal to the speaker 861. The speaker 861 converts the electrical signal into a sound signal for output. On the other hand, the microphone 862 converts a collected sound signal into an electrical signal. The audio circuit 860 receives the electrical signal, converts the electrical signal into audio data, and outputs the audio data to the processor 880 for processing. Then, the processor 180 sends the audio data to, for example, another terminal by using the RF circuit 810, or outputs the audio data to the memory 820 for further processing.

Wi-Fi belongs to a short distance wireless transmission technology. The terminal 800 may help, by using the Wi-Fi module 870, a user to receive and send an email, browse a web page, access stream media, and the like. This provides wireless broadband Internet access for the user. Although FIG. 18 shows the Wi-Fi module 870, it may be understood that the Wi-Fi module 870 is not a mandatory component of the terminal 800, and when required, the Wi-Fi module 870 may be omitted as long as the scope of the essence of the present disclosure is not changed.

The processor 880 is a control center of the terminal 800, uses various interfaces and circuits to connect to all parts of the entire electronic device, and performs various functions of the terminal 800 and processes data by operating or executing a software program and/or module stored in the memory 820 and invoking the data stored in the memory 820, so as to perform overall monitoring on the electronic device. Optionally, the processor 880 may include one or more processing units. Preferably, the processor 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

The terminal 800 further includes the power supply 882 (such as a battery) for supplying power to the components. Preferably, the power supply may be logically connected to the processor 880 by using a power management system, thereby implementing functions such as charging, discharging, and power consumption management by using the power management system.

The camera 890 usually includes a lens, an image sensor, an interface, a digital signal processor, a central processing unit (CPU), a display screen, and the like. The lens is fixed above the image sensor, and the focus can be changed by manually adjusting the lens. The image sensor is equivalent to a "film" of a conventional camera and is a core for the camera to capture an image. The interface is configured to connect the camera to a motherboard of an electronic device by using a cable and a board-to-board connector in a spring-type connection manner, and send a captured image to the memory 820. The digital signal processor processes the captured image by performing a mathematical operation, converts a captured analog image into a digital image, and sends the digital image to the memory 820 through the interface.

Although not shown in the figure, the terminal 800 may further include a Bluetooth module and the like. Details are not further described herein.

Figure 19:
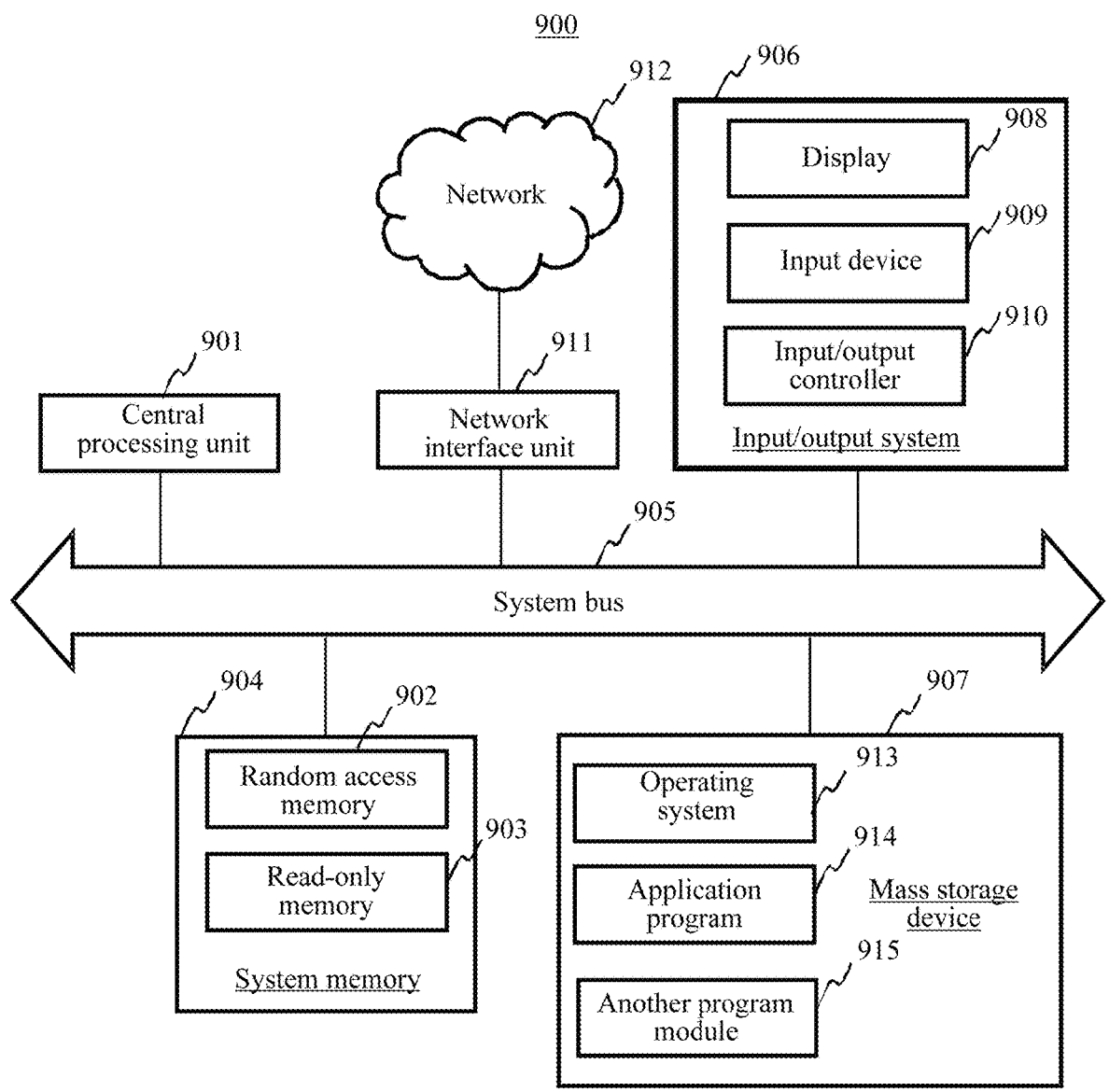
FIG. 19 is a schematic structural diagram of a server according to an exemplary embodiment of this application.

FIG. 19 is a schematic structural diagram of a server according to an embodiment of this application. The server may be the web server 120, the service server 130, the database server 140, and the file server 150 shown in FIG. 1. Specifically, the server 900 includes a CPU 901, a system memory 904 including a RAM 902 and a ROM 903, and a system bus 905 connecting the system memory 904 and the CPU 901. The server 900 further includes a basic input/output system (I/O system) 906 for transmitting information between components in a computer, and a mass storage device 907 used for storing an operating system 913, an application program 914, and another program module 915.

The basic I/O system 906 includes a display 908 configured to display information, and an input device 909 used by a user to input information, such as a mouse or a keyboard. The display 908 and the input device 909 are both connected to the CPU 901 by using an input/output controller 910 connected to the system bus 905. The basic I/O system 906 may further include the input/output controller 910, to receive and process inputs from multiple other devices, such as the keyboard, the mouse, or an electronic stylus. Similarly, the input/output controller 910 further provides an output to a display screen, a printer or another type of output device.

The mass storage device 907 is connected to the CPU 901 by using a mass storage controller (not shown) connected to the system bus 905. The mass storage device 907 and an associated computer readable medium provide non-volatile storage for the server 900. That is, the mass storage device 907 may include a computer readable medium (not shown) such as a hard disk or a compact disc ROM (CD-ROM) drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may know that the computer storage medium is not limited to the foregoing types. The system memory 904 and the mass storage device 907 may be collectively referred to as a memory.

According to the embodiments of this application, the server 900 may further be connected, through a network such as the Internet, to a remote computer on the network. That is, the server 900 may be connected to a network 912 by using a network interface unit 911 connected to the system bus 905, or may be connected to another type of network or a remote computer system (not shown) by using a network interface unit 911.

An embodiment of this application further provides a computer readable storage medium. The computer readable storage medium may be a computer readable storage medium included in the memory in the foregoing embodiment, or may be a computer readable storage medium that exists alone and is not assembled into a terminal. The computer readable storage medium stores one or more programs. The one or more programs are executed by one or more processors to perform the digital watermark embedding method and/or the digital watermark extraction method.

The sequence numbers of the foregoing embodiments of this application are merely for description purpose and do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A digital watermark embedding method, applied to a service server, the method comprising:
   obtaining a digital watermark of a composite file, the composite file comprising at least two carriers;
   splitting the digital watermark into N sub-watermarks according to a carrier quantity N of the composite file, each sub-watermark being corresponding to partial content of the digital watermark, N being a positive integer, and N>1;
   embedding an $i^{th}$ sub-watermark in an $i^{th}$ carrier of the composite file, to obtain an $i^{th}$ target carrier, i being a positive integer, and $1 \leq i \leq N$, wherein the embedding an $i^{th}$ sub-watermark in an $i^{th}$ carrier of the composite file comprises:
      determining, according to a format of the $i^{th}$ carrier, a watermark embedding algorithm corresponding to the format of the $i^{th}$ carrier; and
      embedding the $i^{th}$ sub-watermark in the $i^{th}$ carrier of the composite file according to the watermark embedding algorithm corresponding to the format of the $i^{th}$ carrier; and
   integrating N target carriers into a target file.

2. The method according to claim 1, wherein the $i^{th}$ carrier is an image; and
   the embedding the $i^{th}$ sub-watermark in the $i^{th}$ carrier of the composite file according to the watermark embedding algorithm corresponding to the format of the $i^{th}$ carrier comprises:
   converting the $i^{th}$ sub-watermark into a first binary bit stream, a bit quantity of the first binary bit stream being n, n being a positive integer, $j^{th}$-bit data in the first binary bit stream being data $S_j$, a value of the data $S_j$ being 0 or 1, j being a positive integer, and $1 \leq j \leq n$;
   sequentially grouping pixels in the image into pixel pairs in a predetermined division order, each pixel pair comprising grayscale values of two adjacent pixels;
   randomly determining an embedding position k of the $i^{th}$ sub-watermark, k being a positive integer; and
   embedding, in a $(k+j-1)^{th}$ pixel pair, the data $S_j$ in the first binary bit stream by using a $k^{th}$ pixel pair as a start point.

3. The method according to claim 2, wherein a grayscale value of a former pixel in each pixel pair is a first grayscale value, and a grayscale value of a latter pixel in each pixel pair is a second grayscale value; and
   the embedding, in a $(k+j-1)^{th}$ pixel pair, the data $S_j$ in the first binary bit stream by using a $k^{th}$ pixel pair as a start point comprises:
   calculating an average value of and a difference between the first grayscale value and the second grayscale value in the $(k+j-1)^{th}$ pixel pair;
   multiplying the difference by 2, plus the data $S_j$ in the first binary bit stream, to obtain a target difference; and
   calculating a first target grayscale value and a second target grayscale value of the $(k+j-1)^{th}$ pixel pair by using the average value and the target difference, to obtain a $(k+j-1)^{th}$ target pixel pair.

4. The method according to claim 1, wherein the $i^{th}$ carrier is a PDF document; and
   the embedding the $i^{th}$ sub-watermark in the $i^{th}$ carrier of the composite file according to the watermark embedding algorithm corresponding to the format of the $i^{th}$ carrier comprises:
   reading the PDF document;
   looking up a cross-reference table of the PDF document, to find the last cross-reference section in the cross-reference table; and
   sequentially embedding the $i^{th}$ sub-watermark in space characters in the last cross-reference section, one bit of data in the $i^{th}$ sub-watermark being embedded in each space character.

5. The method according to claim 1, wherein after the integrating N target carriers into a target file, the method further comprises:
   storing related information of the digital watermark, the related information of the digital watermark comprising a correspondence between the digital watermark and the composite file, a generation rule of the digital watermark, a splitting rule of the digital watermark, and an embedding rule of the digital watermark.

6. A digital watermark extraction method, applied to a service server, the method comprising:
   extracting a corresponding sub-watermark from each carrier comprised in a target file after the target file is obtained, wherein the target file comprises N carriers, N is a positive integer, and N>1; and the extracting a corresponding sub-watermark from each carrier comprised in a target file comprises:
   determining, according to a format of an $i^{th}$ carrier, an inversion algorithm of a watermark embedding algorithm corresponding to the format of the $i^{th}$ carrier; and
   extracting an $i^{th}$ sub-watermark from the $i^{th}$ carrier according to the inversion algorithm of the watermark embedding algorithm corresponding to the format of the $i^{th}$ carrier, i being a positive integer, and $1 \leq i \leq N$;
   combining the extracted sub-watermarks into a digital watermark; and
   verifying the digital watermark;
   the target file comprising at least two carriers, the digital watermark being an implicit identifier embedded in the target file, the sub-watermark being an implicit identifier embedded in a corresponding carrier, and each sub-watermark being corresponding to partial content of the digital watermark.

7. The method according to claim 6, wherein the $i^{th}$ carrier is an image; and the extracting an i$^{th}$ sub-watermark from the i$^{th}$ carrier according to the inversion algorithm of the watermark embedding algorithm corresponding to the format of the i$^{th}$ carrier comprises:

sequentially dividing a target image in the target file into pixel pairs in a predetermined division order, each pixel pair comprising grayscale values of two adjacent pixels;

obtaining an embedding position k of the i$^{th}$ sub-watermark and a bit quantity n of a first binary bit stream, the first binary bit stream being obtained by converting the i$^{th}$ sub-watermark, the embedding position k being randomly determined, k being a positive integer, and n being a positive integer;

respectively determining a k$^{th}$ pixel pair to a (k+n−1)$^{th}$ pixel pair as a first target pixel pair to an n$^{th}$ target pixel pair according to the embedding position k and the bit quantity n of the first binary bit stream;

determining corresponding data S$_j$ according to a j$^{th}$ target pixel pair, the data S$_j$ being j$^{th}$-bit data in the first binary bit stream, j being a positive integer, and 1≤j≤n;

sequentially forming the determined data S$_j$ into the first binary bit stream; and converting the first binary bit stream to obtain the i$^{th}$ sub-watermark.

8. The method according to claim 7, wherein a grayscale value of a former pixel in the target pixel pair is a first target grayscale value, and a grayscale value of a latter pixel in the target pixel pair is a second target grayscale value; and
wherein the determining corresponding data S$_j$ according to a i$^{th}$ target pixel pair comprises:
calculating a difference between the first target grayscale value and the second target grayscale value of the j$^{th}$ target pixel pair; and
determining a lowest bit of data of a binary representation of the difference as the corresponding data S$_j$.

9. The method according to claim 6, wherein the i$^{th}$ carrier is a PDF document; and
the extracting an i$^{th}$ sub-watermark from the i$^{th}$ carrier according to the inversion algorithm of the watermark embedding algorithm corresponding to the format of the i$^{th}$ carrier comprises:
reading a target PDF document of the target file;
looking up a cross-reference table of the target PDF document, to identify the last cross-reference section in the cross-reference table;
obtaining a digit quantity n of the i$^{th}$ sub-watermark, n being a positive integer;
sequentially reading, from a first space character position to an n$^{th}$ space character position in the last cross-reference section, data corresponding to the space character positions; and
combining the data corresponding to the space character positions into the i$^{th}$ sub-watermark.

10. The method according to claim 6, wherein the verifying the digital watermark comprises:
verifying the extracted digital watermark according to stored related information of the digital watermark, the related information of the digital watermark comprises a correspondence between the digital watermark and a composite file, a generation rule of the digital watermark, a splitting rule of the digital watermark, and an embedding rule of the digital watermark.

11. A server comprising:
a processor;
a memory; and
one or more programs stored on the memory, wherein the one or more programs are executable by the processor to:
extract a corresponding sub-watermark from each carrier comprised in a target file after the target file is obtained, wherein the target file comprises N carriers, N is a positive integer, and N>1; and wherein the one or more programs are executable by the processor to extract the corresponding sub-watermark from each carrier comprised in the target file by:
determining, according to a format of an i$^{th}$ carrier, an inversion algorithm of a watermark embedding algorithm corresponding to the format of the i$^{th}$ carrier; and
extracting an i$^{th}$ sub-watermark from the i$^{th}$ carrier according to the inversion algorithm of the watermark embedding algorithm corresponding to the format of the i$^{th}$ carrier, i being a positive integer, and 1≤i≤N;
combine the extracted sub-watermarks into a digital watermark; and
verify the digital watermark;
the target file comprising at least two carriers, the digital watermark being an implicit identifier embedded in the target file, the sub-watermark being an implicit identifier embedded in a corresponding carrier, and each sub-watermark being corresponding to partial content of the digital watermark.

12. The server according to claim 11, wherein the i$^{th}$ carrier is an image; and
wherein the one or more programs are executable by the processor to extract an i$^{th}$ sub-watermark from the i$^{th}$ carrier according to the inversion algorithm of the watermark embedding algorithm corresponding to the format of the i$^{th}$ carrier by:
sequentially dividing a target image in the target file into pixel pairs in a predetermined division order, each pixel pair comprising grayscale values of two adjacent pixels;
obtaining an embedding position k of the i$^{th}$ sub-watermark and a bit quantity n of a first binary bit stream, the first binary bit stream being obtained by converting the i$^{th}$ sub-watermark, the embedding position k being randomly determined, k being a positive integer, and n being a positive integer;
respectively determining a k$^{th}$ pixel pair to a (k+n−1)$^{th}$ pixel pair as a first target pixel pair to an n$^{th}$ target pixel pair according to the embedding position k and the bit quantity n of the first binary bit stream;
determining corresponding data S$_j$ according to a j$^{th}$ target pixel pair, the data being j$^{th}$-bit data in the first binary bit stream, j being a positive integer, and 1≤j≤n;
sequentially forming the determined data S$_j$ into the first binary bit stream; and
converting the first binary bit stream to obtain the i$^{th}$ sub-watermark.

13. The server according to claim 12, wherein a grayscale value of a former pixel in the target pixel pair is a first target grayscale value, and a grayscale value of a latter pixel in the target pixel pair is a second target grayscale value; and
wherein the one or more programs are executable by the processor to determine the corresponding data S$_j$ according to a j$^{th}$ target pixel pair by:
calculating a difference between the first target grayscale value and the second target grayscale value of the j$^{th}$ target pixel pair; and determining a lowest bit of data of a binary representation of the difference as the corresponding data $S_j$.

14. The server according to claim 11, wherein the $i^{th}$ carrier is a PDF document; and
wherein the one or more programs are executable by the processor to extract an $i^{th}$ sub-watermark from the $i^{th}$ carrier according to the inversion algorithm of the watermark embedding algorithm corresponding to the format of the $i^{th}$ carrier comprises:
reading a target PDF document of the target file;
looking up a cross-reference table of the target PDF document, to identify the last cross-reference section in the cross-reference table;
obtaining a digit quantity n of the $i^{th}$ sub-watermark, n being a positive integer;
sequentially reading, from a first space character position to an $n^{th}$ space character position in the last cross-reference section, data corresponding to the space character positions; and
combining the data corresponding to the space character positions into the $i^{th}$ sub-watermark.

15. The server according to claim 11, wherein the one or more programs are executable by the processor to verify the digital watermark by:
verifying the extracted digital watermark according to stored related information of the digital watermark, the related information of the digital watermark comprises a correspondence between the digital watermark and a composite file, a generation rule of the digital watermark, a splitting rule of the digital watermark, and an embedding rule of the digital watermark.

\* \* \* \* \*